United States Patent [19]

Udvardi-Lakos

[11] 4,058,738
[45] Nov. 15, 1977

[54] METHOD AND CIRCUIT ARRANGEMENT FOR STARTING UP A CONVERTER HAVING FORCED COMMUTATION WITH THE CORRECT PHASE

[75] Inventor: Janos Udvardi-Lakos, Erlangen, Germany

[73] Assignee: Siemens Aktiengesellschaft, Berlin and Munich, Germany

[21] Appl. No.: 617,157

[22] Filed: Sept. 26, 1975

[30] Foreign Application Priority Data

Sept. 27, 1974 Germany ............................ 2446335

[51] Int. Cl.² ............................................. H02J 9/06
[52] U.S. Cl. ..................................... 307/66; 363/49; 363/136
[58] Field of Search ................. 307/64, 66; 321/45 C, 321/45 S

[56] References Cited

U.S. PATENT DOCUMENTS

| | | | |
|---|---|---|---|
| 3,401,327 | 9/1968 | Leppert | 321/45 S |
| 3,703,644 | 11/1972 | Thorborg | 307/64 |
| 3,818,272 | 6/1974 | Rich | 307/66 |

Primary Examiner—William H. Beha, Jr.
Attorney, Agent, or Firm—Kenyon & Kenyon, Reilley, Carr & Chapin

[57] ABSTRACT

The invention concerns an apparatus and method for starting-up, with the correct phase, a converter having forced commutation. More particularly the converter comprises a power stage having controlled main valves and commutation devices associated with the valves. The converter also comprises a control apparatus which includes a drive unit synchronized with a power line voltage for generating firing pulses for the converter valves and a regulating device preceding the drive unit. In accordance with the invention, at least one energy storage device is charged in the stand-by position with an amount of energy required for commutation. Also in the stand-by position, the firing pulses generated by the drive unit of the continuously running control apparatus are blocked from their respective converter valves. Upon a starting command, the stored energy in the storage device is made available for commutation and the firing pulses are released to their respective valves.

22 Claims, 36 Drawing Figures

METHOD AND CIRCUIT ARRANGEMENT FOR STARTING UP A CONVERTER HAVING FORCED COMMUTATION WITH THE CORRECT PHASE

DETAILED DESCRIPTION

Field of the Invention

The invention pertains to a method for starting-up, with the correct phase, a converter having forced commutation and comprising a power stage having controlled main valves and commutation devices associated with these valves, and a control apparatus which includes a drive unit synchronized with a power line voltage for generating firing pulses which is preceding by a regulating device. The invention further pertains to apparatus for implementing such a starting-up method.

In known static converters of the above-type, the starting-up process takes a certain amount of time, as the commutation devices employed therein are initially uncharged and, therefore, cannot immediately quench the full valve currents. Customarily, the output voltage of the converter is, therefore, raised gradually by apprpriately changing the firing angle of the firing pulses, starting from a small initial value up to the nominal value of the output voltage of the converter. This process extends over several commutation processes and thus is disadvantageous particularly in converters in which a fast load take-over is required. Such is the case, for example, if the converter, as a supplemental power unit, is to cover demand peaks of a power system or if the converter is used in an interruption-free power supply installation, in which a load is supplied in normal operation directly from a power system and in emergency operation from a substitute power source via an inverter.

It is therefore an object of the present invention to provide a method and a circuit arrangement for starting-up a static converter by means of which such starting-up occurs with the correct phase and in an extremely short time.

SUMMARY OF THE INVENTION

The above and other objectives are accomplished in accordance with the principles of the invention by a starting-up process including the following steps:

a. In the stand-by position, charging an energy storage device of the converter with an amount of energy required for commutation, b. in the stand-by position, blocking the firing pulses from the drive unit of the continuously running control apparatus of the converter, and c. upon a starting command, making the stored energy available for commutation and releasing the firing pulses.

In the stand-by position, the converter is thus not operating, but the control apparatus with the regulating device and the drive unit is already running. In stand-by operation, moreover, the firing pulses of the drive unit are blocked. Additionally, in stand-by, an amount of energy sufficient for the commutation is made available either to the commutation devices themselves or to supplemental energy storage devices. Only minimal operating costs accrue due to the aforesaid continuous operation of the control apparatus and the making available of the amount of aforesaid energy. Losses and noise in the power stage of the converter, particularly due to transformers and chokes, are not produced in stand-by operation. Upon a starting command, the firing pulses can now be released immediately, as a sufficient amount of energy for the initial commutation is already available. The converter is thereby brought to its full power output with the correct phase and in an extremely short time.

In one circuit arrangement for implementing the above starting-up method, at least one energy storage device with a charging device, connected with the commutation device of the converter, is provided. In this arrangement a release unit which is controlled by a starting device is arranged between the drive unit and the controlled valves of the converter.

In another circuit arrangement for providing the starting-up method, two energy storage devices are provided and are charged in stand-by position with amounts of energy of opposite polarity. Upon a starting command, energy is made available for commutation whose polarity is required for the commutation of the converter valve that is being addressed by the then present firing pulse. The firing pulses are then released.

In order to start a converter with the correct phase with respect to a power system, it is necessary that, at the instant of a starting, the output voltage of the converter have the same polarity as the power line voltage. A definite polarity of the energy required for commutation can thus be associated with a given polarity of the output voltage of the converter. In order that the converter can in fact be started at any desired instant with any of the two possible polarities, amounts of energy of both polarities can thus be made available, according to the method of the present invention. At the instant of starting, that amount of energy which has the required polarity is then switched to the respective commutation device. After the commutation device is charged up, the firing pulses can be released immediately. The delay that occurs with the present starting-up method is, therefor, very short and is determined only by the time which it takes to charge up the energy storage device in the commutation circuits of the converter. For the first commutation process it is, in general, not necessary to provide the commutation circuits with the full charge which they receive in the subsequent power operation.

In another circuit arrangement for implementing the starting-up method of the invention, the commutation circuits of the converter are thus connected, via controlled switching devices, with two additional energy storage devices each having a charging device. Additionally, a starting device is provided which, upon a starting command, connects the commutation devices of the converter with that additional energy storage device each having a charging device. Addtionally, a starting device is provided which, upon a starting command, connects the commutation devices of the converter with that additional energy storage device whose amount of energy has the polarity which is necessary for commutating the converter valve addressed by the then present firing pulse and which, after the energy has been coupled into the commutation device, switches a release unit for releasing the firing pulse. More particularly, in this arrangement the commutation capacitors in the commutation devices of the converter are connected, via a switching device controlled by the starting device, either with a capacitor which is charged to a positive potential by a charging device or with a capacitor which is charged to a negative potential by a charging device.

For many applications it will be sufficient if the present converter is started with a delay which corresponds to a half-period of the a-c voltage. In these cases, it is sufficient to provide only a single energy storage device which is charged in the stand-by position with an amount of energy, sufficient for commutation, of one given polarity. In such case, the firing pulses have to be released when the required polarity of the output voltage of the converter agrees with the output voltage which is possible which the polarity of the stored amount of energy.

A reduction of the circuitry required in the present converter can be realized by not storing the needed energy in additional energy storage devices but by providing in the commutation devices of the converter two energy storage devices which are connected with a charging device and are charged in the stand-by position with opposite polarities and which are connected parallel in power operation. In this case, the firing pulses are released in such a manner that those main valves are fired immediately which are associated with the polarity of the output voltage of the converter which is required at the starting instant. In particular; for the first commutation of a converter valve, that energy storage device is switched to the respective commutation device, whose precharge has the correct polarity for quenching the valve. From the next commutation on, the two energy storage devices in the commutation devices are always connected together during the commutation processes.

The above arrangement of the present converter can be realized by providing, in the commutation devices for the converter valves, two commutating capacitors which are charged in the stand-by position, via charging devices, with opposite polarities and which are connected parallel in power operation. In the aforesaid pre-charging operation, the charging voltage for each commutating capacitor is advantageously chosen higher than the commutation voltage occurring in power operation. As a result, sufficient energy for quenching the full valve current is immediately available for the first commutation.

For cases in which starting-up with a very small delay is permissible, the starting-up method according to the invention can be carried out by charging, in the stand-by position, one energy storage device in the commutation devices of the converter. Upon a starting command, the release of the firing pulses is delayed to the beginning of the next half-wave of the output voltage of the converter, whose polarity is predetermined by the pre-charge of the energy storage devices in the commutation devices. The maximum possible delay during this starting method is thus one period of the a-c voltage.

A circuit arrangement thus for accomplishing the preceding method of the invention includes a flipflop, whose setting input is fed by the firing pulses for the one polarity of a phase of the output voltage of the converter and whose resetting input is fed by the firing pulses for the inverse polarity of this phase of the output voltage of the converter. Additionally, a logic member is provided which follows the flipflop and which sets a storage device in the presence of a starting command and a dynamic flank of the output signal of the flipflop, the output signal of the storage device controlling a release unit for firing the pulses.

Where a still shorter delay in starting up is required the method of the present invention can be carried out by first charging one energy storage device in the commutation devices of the converter in the stand-by position with a predetermined polarity. Upon a starting command, the firing pulses are then released instantly, if the polarity of the output voltage of the converter, which is determined by the polarity of the pre-charge of the commutation devices, agrees with the required polarity. If the polarity of the output voltage of the converter, which is predetermined by the polarity of the pre-charge of the commutation devices, does not agree with the required polarity, then the release of the firing pulses is delayed until the polarities agree. The maximally possible delay with this method is thus one half-period of the a-c voltage.

A suitable circuit arrangement for realizing the preceding method includes a starting device having a flipflop whose setting input is fed by the firing pulses for the one polarity of the output voltage of the converter and whose resetting input is fed by the firing pulses for the inverse polarity of the output voltage of the converter. Further, a logic member for conjunctively linking the starting command with the output signal of the flipflop is provided. The output signal of the logic member, in turn, is used to control inhibit gates provided for controlling the release of the firing pulses.

In still another starting-up method according to the invention, it is again provided that, in the stand-by position, one energy storage device in the commutation devices of the converter is charged with a predetermined polarity. Upon a starting command, that converter valve is fired instantly which has the polarity of the output voltage of the converter which is determined by the polarity of the pre-charge of the energy storage devices. If this polarity of the output voltage of the converter does not agree with the required polarity, rapidly succeeding commutations are carried out until the output voltage of the converter has the required polarity. The particular advantage of this method is that it permits a very fast start employing any pulsing method for the converter.

A circuit arrangement suitable for carrying out the aforesaid method includes a clock generator which can be started by the starting command and whose clock frequency is substantially higher than the frequency of the output voltage of the inverter. A gating circuit is also provided which is fed by the firing pulses of the drive unit and by release or inhibit signals of a flipflop which is controlled by the starting command and by a coincidence stage which compares the firing pulses of the drive unit with the clock signals of the clock generator.

It is not advisable to start a converter whose drive unit is synchronized with a power system, if a commutation takes place immediately after the starting instant. In order to prevent this, it is further provided according to the starting-up method of the present invention that the firing pulses are released upon a starting command, but that a change of the firing pulses is inhibited for a predetermined period of time which is longer than the duration of one commutation.

For converters which are controlled by a pulse method which includes rapidly succeeding commutations, it is provided in a further aspect of the starting-up method of the present invention that upon a starting command, the change of the firing pulses is at first inhibited for a first predetermined period of time which is longer than the duration of one commutation. Thereupon, the change of the firing pulses is released for a second predetermined period of time which is shorter than the duration of one commutation. Subsequently, the change of the firing pulses is again inhibited for a third predetermined period of time which is longer than the duration of one commutation. Ultimately, after a predetermined number of such inhibit and release cycles, the firing pulses are released indefinitely.

A circuit arrangement suited for realizing the preceding method includes a storage unit which contains a number of storage devices having inhibit gates on their input and input sides. The inhibit gates on the output sides are switched into conduction by a starting device. The inhibit gates on the output sides are, in turn, caused to conduct or to be cut off by the output signal of a delay circuit which includes three series-connected monostable multivibrators and a conjunctive logic member whose inputs are connected with the outputs of the first and third multivibrators. The first multivibrator is acted upon by the starting command and has a pulse width corresponding the the first predetermined time period. The second multivibrator is driven by the first multivibrator and has a pulse width corresponding to the second predetermined time period. The third multivibrator is driven by the second multivibrator and has a pulse width corresponding to a third predetermined time period.

BRIEF DESCRIPTION OF THE DRAWINGS

The above and other aspects and features of the present invention will become more apparent upon reading the following detailed description in conjunction with the accompanying drawings in which:

FIGS. 13b, 13c and 13d illustrate waveforms appearing in the converter of FIG. 13a;

FIGS. 13f and 13g show further waveforms for the converter of FIG. 13a;

FIG. 25b, 25c and 25d illustrate waveforms of signals appearing in the circuit of FIG. 25a; and FIG. 25e shows a modification of the circuit arrangement of FIG. 25a.

DETAILED DESCRIPTION

Figure 1:
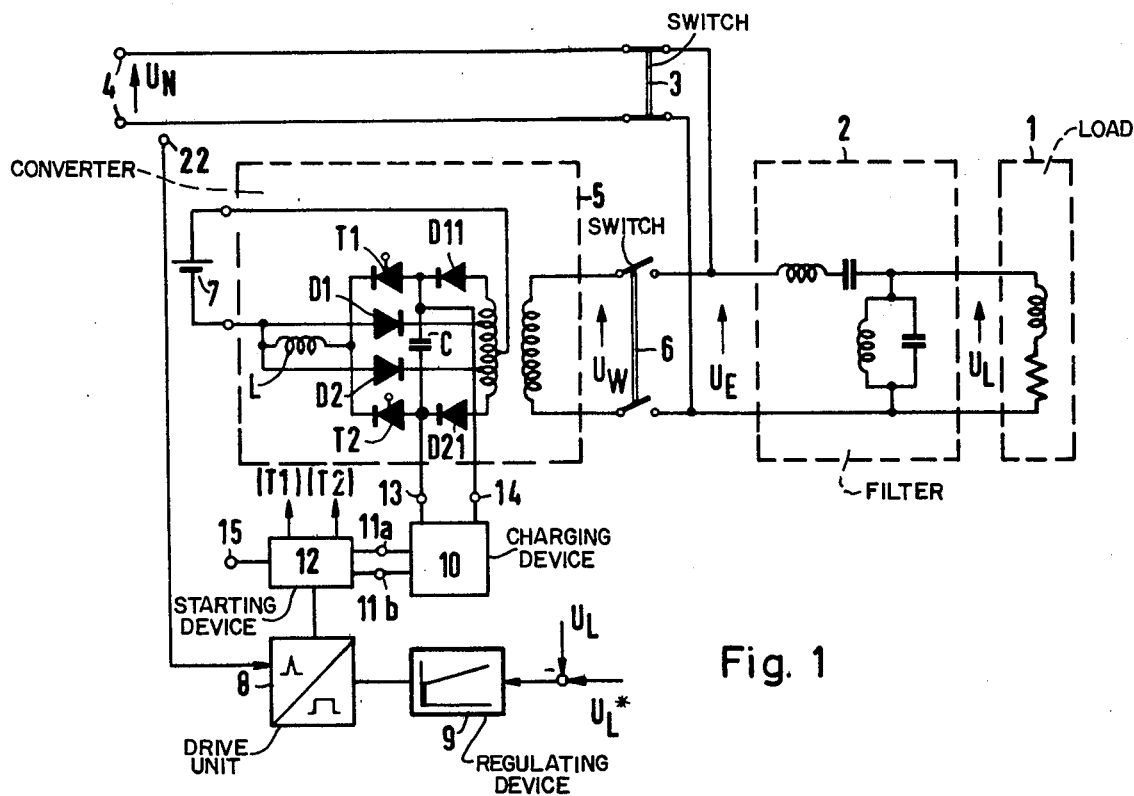
FIG. 1 shows a circuit arrangement having a converter which starts up in accordance with a first embodiment of the starting-up method of the present invention.

In FIG. 1, a load 1 is connected via a filter 2, which is, for instance, designed in the form of a bandpass filter, and a power line switch 3, which during normal operation is switched to conduction, to a power network 4 which supplies a line voltage $U_N$. In the event of a disturbance which would injure the load, or of a line voltage failure, a monitoring device, not shown in detail, institutes a switching operation which places the load in an emergency operation status. In particular, at this time the converter 5 is started, the power line switch 3 is switched to the blocking position and a further switch 6 at the output of the converter is switched to conduction. The load 1 is thus now supplied via the filer 2 with the output voltage U derived by the converter 5 from the power source 7. The latter source 7 may be provided by primary or storage batteries, an external d-c voltage system or fuel cells.

In power line operation, the filter 2 attenuates the high-frequency and low-frequency distortion of the line voltage $U_N$ and in emergency operation filters the output voltage $U_N$ of the converter. When switching occurs from power line operation to emergency operation, the energy-storing filter elements serve for a short time to supply voltage to the load 1 thereby preventing any voltage interruption. In the case of consumers who are insensitive to distortion and brief interruptions of their supply voltage, the filter can be omitted. As shown, the input voltage of the filter is designated as $U_E$ and the load voltage with $U_L$.

It should be pointed out that since no current can flow on the converter side of the output transformer TF of the converter if the converter valves are not fired, the switch 6, in principle, may be omitted. However, the switch 6 is generally included in practice to facilitate maintenance work.

The switches 3 and 6 may typically be mechanical quick-acting switches, vacuum circuit breakers or contactors, possibly with special tripping mechanisms. Semiconductor switches which have natural or forced commutation and which employ thyristors (SCR's), turn-off thyristors, Triacs, ignitrons or discharge valves may also be used. Additionally, combinations of the aforesaid switching devices connected in series or in parallel might also be employed.

In order for the converter 5 to start its operation as fast or quickly possible the control apparatus of the converter comprising drive unit 8 and regulating device 9 is operative in a stand-by position when the load 1 is being supplied from the power system 4. The drive unit 8 supplies firing pulses at its output which are coupled to a starting device 12 which blocks the firing pulses from reaching the controlled converter valves in the stand-by position. The starting device 12 is connected to a charging device 10 for charging the energy storage devices in the commutation circuits of the inverter only upon a starting command at the terminal 15 and releases the firing pulses after the charging is accomplished.

In the present illustrative embodiment, the converter 5 comprises a center-tap bridge circuit which includes the controlled valves T1 and T2 and the series diodes D11 and D21. In addition, bypass diodes D1 and D2 are also provided. The commutation circuit of the converter, in turn, is formed by a commutation capacitor C and a commutation inductance L. The output voltage $U_W$ of the converter can have a given polarity only if the capacitor voltage or the stage of magnetization of the inductance also have a given polarity. The charging device 10 charges the energy storage devices in the commutation circuits of the converter with that polarity which is associated with the converter valve which is being addressed by the then present firing pulse and has the desired polarity of the output voltage of the converter.

The regulating device 9, which, as above indicated, is also operative in the stand-by position, receives at its input a control difference signal indicative of the difference signal between a desired value $U_L$ of the load voltage and the actual value $U_L^*$ thereof. The regulating device thus furnishes in the stand-by position a control voltage for the drive unit 8 which permits the unit to establish the correct firing angle for its firing pulses in the stand-by position. In particular, suitable steps can be taken to ensure that the regulating device 9 is operative in the stand-by position and supplies the required control voltage for the drive unit.

Figure 2:
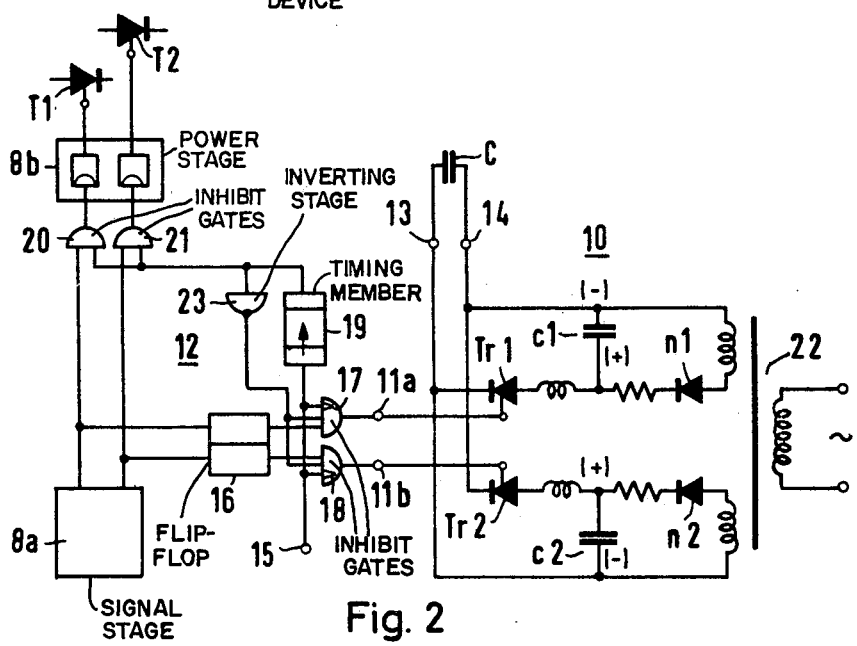
FIG. 2 illustrates in detail the starting and charging devices for the commutating capacitor in the converter of FIG. 1.

FIG. 2 shows in schematic fashion the starting device 12 and a charging device 10 in greater detail. As can be seen, the starting device 12 is arranged between the signal stage 8a and the power stage 8b of the drive unit 8, so that the signal processing can be carried out at a low power level. More particularly, the firing pulses generated by the signal stage 8a are coupled into the inhibit gates 20 and 21. If the inhibit gates 20, 21 are controlled into conduction, then the firing pulses of the signal stage 8a are amplified in the output stage 8b and are impressed on the firing paths of the converter valves T1 and T2. If the gates 20, 21 are not conducting, on the other hand, the pulses are blocked and do not reach output stages.

The firing pulses of the stage 8a are also coupled to the setting input and the resetting input of a flipflop 16. The signal state of the flipflop 16 thus indicates which of the two converter valves T1 or T2 would be fired if it were addressed by the firing pulses blocked by the inhibit gates 20, 21. The outputs of the flipflop 16 are each, in turn, connected to an input of further inhibit gates 17 and 18, whose second inputs are designed as dynamic inputs and are connected together and to the terminal 15.

The charging device 10 includes a transformer 22 which is connected on its primary side to an a-c voltage and has two secondary windings. The secondary voltages of the transformer 22 are rectified in diodes $n1$ and $n2$ and charge the capacitors $c1$ and $c2$, respectively. The capacitors $c1$ and $c2$ are connected across the terminals 13 and 14, which are connected to the terminals of the commutating capacitor C, via thyristors $Tr1$ and $Tr2$ which act as controlled electronic switches. The control paths of the thyristors $Tr1$ and $Tr2$ are connected, in turn, to the outputs $11a$ and $11b$ of the inhibit gates 17 and 18.

Upon a starting command at the terminal 15, either the inhibit gate 17 or the inhibit gate 18 is addressed in pulse-fashion, depending on whether a firing pulse for the converter valve T1 or for the converter valve T2 is just then being formed by the signal stage 8a of the drive unit. The output signal from the conducting inhibit gate 17 or 18 then causes one of the thyristors $Tr1$ or $Tr2$ to conduct. Thereby, either the charge of the capacitor $c1$ or the charge of the capacitor $c2$ is shifted to the commutating capacitor C. Thereafter, the inverting stage 23 has the effect of preventing the thyristors $Tr1$ and $Tr2$ from being further addressed.

If, for example, at the instant of the starting command a firing pulse for the converter valve T1 has already been delivered, the inhibit gate 17 is controlled into conduction thereby firing the thyristor $Tr1$ in the charging device 10. Thus the charge of the capacitor $c1$ flows to the commutating capacitor C, a positive charge polarity appearing at the terminal 13 and a negtive charge polarity at the terminal 14. As soon as the commutating capacitor C is charged, the control path of the converter valve T1 is then permitted to be addressed by a firing pulse. For this purpose, a timing member 19 having a delayed response time is provided. In particular, member 19 is triggered by the starting command at the terminal 15 and after a delay time develops an output signal which brings the inhibit gates 20 and 21 controlling the firing pulses from state 8a into conduction. The delay time of the timing member 19 corresponds to the time which is required for quick charging of the commutating capacitor C. If the starting command is a continuous signal, the inhibit gates 20, 21 remain conducting during the entire operation time of the converter. For a pulse-shaped starting command, the timing member 19 is followed by a storage device, which is reset when the converter is switched off. After the converter 5 is started, the capacitors $c1$ and $c2$ in the charging device 10 are charged again. Moreover, the drive for the thyristors $Tr1$ and $Tr2$ in the charging device is now blocked during the operation of the converter by the output signal of the inverting stage 23 coupled to the inhibit gates 17 and 18.

Figure 3:
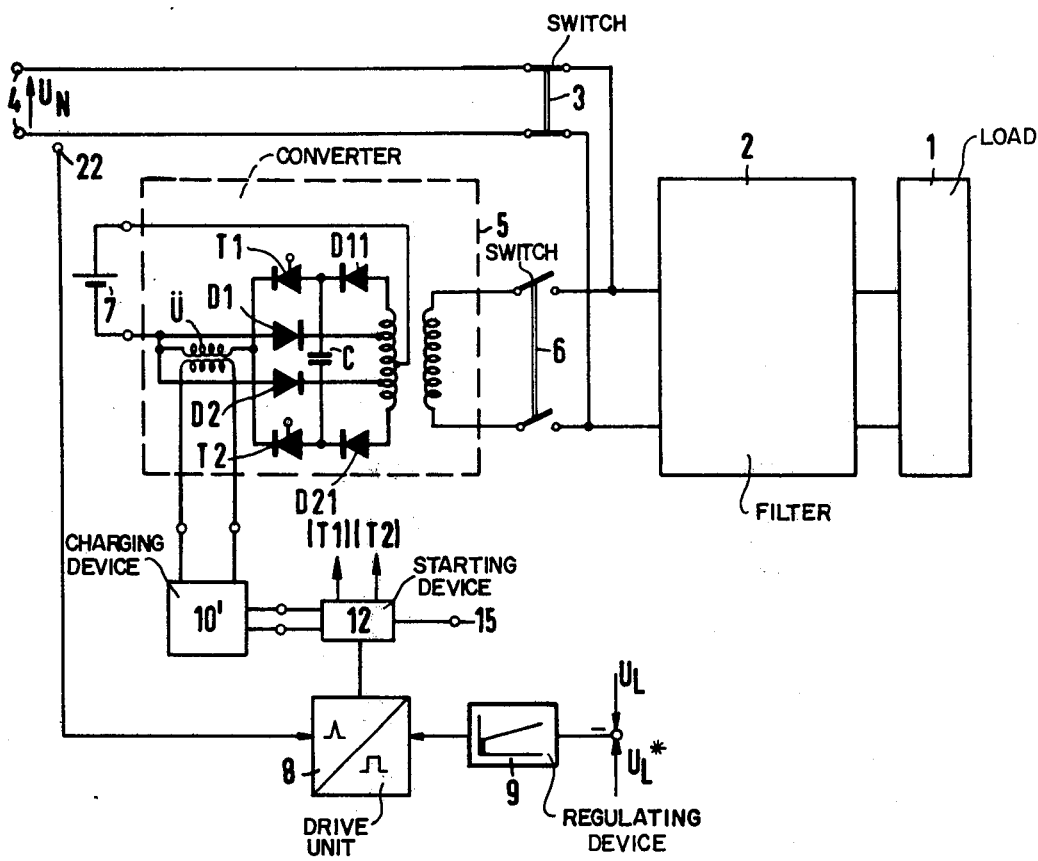
FIG. 3 shows a charging device for the commutating inductance in the converter of FIG. 1.

FIG. 3 shows a coresponding circuit arrangement for the fast charging of a commutating inductance. The commutating inductance U corresponds the the inductance in FIG. 1 and includes two windings on a common iron core, one of which is connected to the output terminals of a charging device designated as 10'. The operation of the charging device 10' is analagous to that already described for the corresponding charging device 10 in FIG. 2 and, thus, will not be further discussed.

Whether only the commutating capacitor or the commutating inductance, or whether both must be charged prior to the start of the inverter depends upon the particular inverter design. In some cases, several charging devices of either type 10 or 10' or a combination of these charging devices may be needed.

Figure 4:
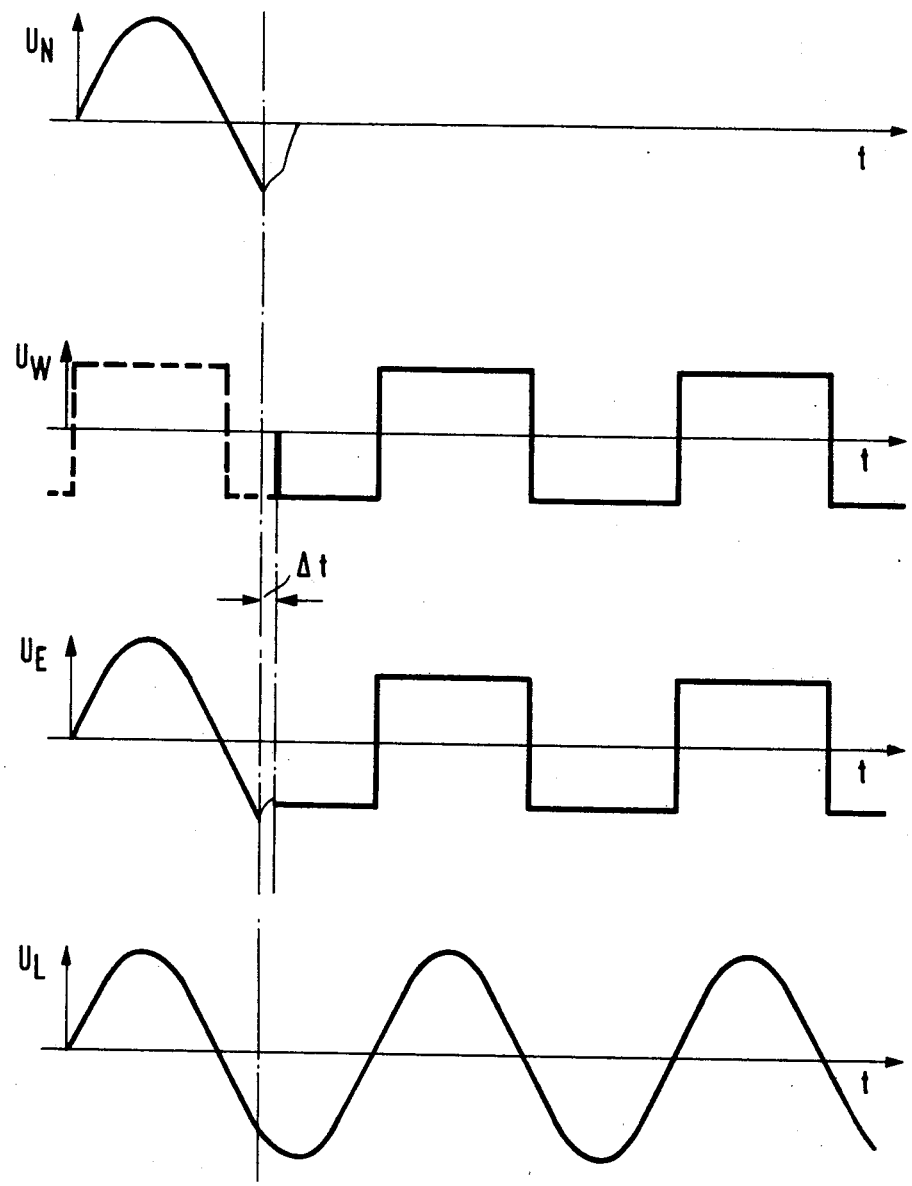
FIG. 4 shows typical voltage waveforms appearing during the starting-up of the converter of FIG. 1.

FIG. 4 shows waveform diagrams of the line voltage $U_N$, the inverter output voltage $U_W$, the filter input voltage $U_E$ and the load voltage $U_L$ appearing in the circuit arrangement of FIG. 1. In the negative halfwave of the line voltage $U_N$, a break in the line voltage occurs. In order to result in load voltage with the correct phase, the converter 5 must, thus, be started so as to produce a negative polarity voltage at its output. This means that the converter valve T2 must be fired in order to start the converter. Before the converter valve T2 can be fired, the energy storage devices in the commutation circuits must first be charged with a corresponding polarity, so that the valve current can be quenched during the commutation process. This charging of the energy storage devices in the commutation circuits takes place during a brief time interval $t$. When the energy storage devices in the commutation circuits are charged, the firing pulses for the valve T2 are released. The solid waveform of the output voltage $U_W$ of the converter results. During the brief time interval $t$, the switching from line operation to emergency operation is also carried out by the switches 3 and 6. At the input of the filter 2, a voltage $U_E$, therefore, appears, which comprises, at first, the line voltage and, after the converter has been started, the output voltage of the latter. The filter 2 attenuates the voltage break, so that no appreciable voltage dip results in the load voltage, with the exception of a slight distortion in the negative half-wave.

It is noted that in the embodiment of FIG. 1 only, a single-phase converter is employed. However, the principles of the invention can be readily applied to multiphase converters as well by adding corresponding charging devices of the type described.

Figure 5:
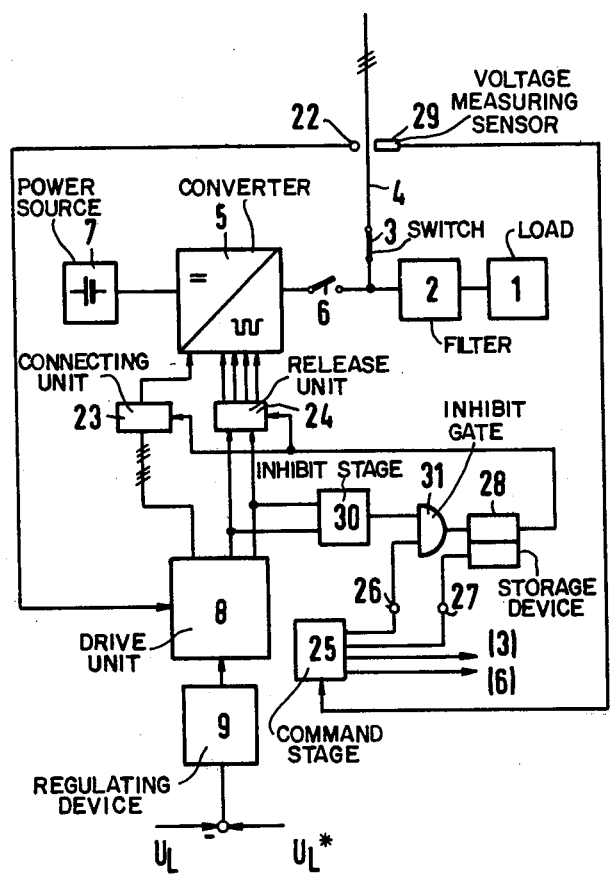
FIG. 5 shows a circuit arrangement including a converter which can be started with a second embodiment of the starting-up method according to the present invention.

FIG. 5 illustrates a second embodiment of the invention. As shown, a load 1 is connected via a filter 2 and a power line switch 3 either to a power system 4 or to the output of a converter 5, the latter converter being supplied from a substitute power source 7. The converter 5 is controlled by firing pulses of a drive unit 8 which is synchronized via a synchronization tap 22 with the line voltage of the power system 4. The latter firing pulses are coupled from the drive unit 8 to converter 5 via a connecting unit 23' and a release unit 24. A regulating device 9 feeding the drive unit 8 in the form of a voltage regulator is acted upon in a known manner by a reference voltage $U_L^*$ and the actual load voltage value $U_L$. Associated with the regulating device 9 is, preferably, a servo follow-up device which ensures that the output voltage of the regulating device 9 has the correct value at the beginning of start-up instant of the converter 5. The latter follow-up device is not specifically shown in order not to over-complicate the drawing.

For controlling the starting process, a command stage 25 is provided, which is connected on the input side with a voltage measuring sensor 29 which senses the line voltage of the power system 4. While not shown, the command stage can be addressed also by other measured quantities. In the event of a dip in the line voltage, the command stage 25 generates a starting signal. The starting signal appears at the terminal 26 and sets a storage device 28, whose output signal operates the connecting unit 23 causing the latter to release the firing pulses of the drive unit 8 to the converter 5. WHen the line voltage recovers, the command stage 25 generates a reset signal at the terminal 27 for the storage device 28. The command stage 25 furthermore controls the power line switch 3 and the switch 6 in the output of the converter 5.

Figure 6:
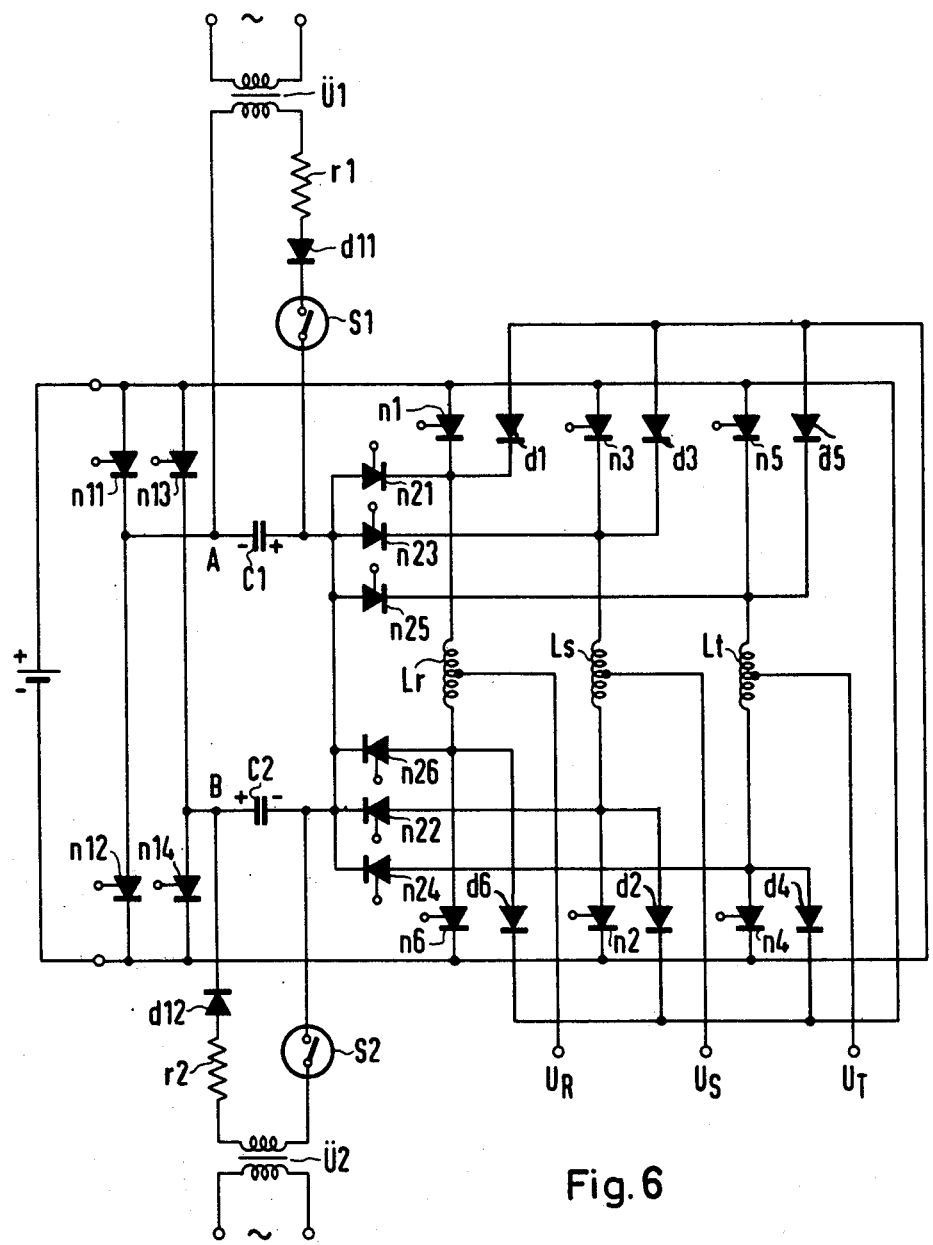
FIG. 6 shows in greater detail the converter of FIG. 5.

In FIG. 6 the internal circuitry of the converter in FIG. 5 is shown in detail. In FIG. 6, the main valves of the converter are designated as $n1$ to $n6$ and the bypass diodes, which are connected antiparallel to them, as $d1$ to $d6$. The commutation devices of the converter include the quenching valves $n21$ to $n26$ and the commutating capacitors C1 and C2. The phase voltages $U_R$, $U_S$, $U_T$ of the converter appear at the chokes $Lr$, $Ls$, $Lt$.

As can be appreciated, contrary to known converter circuits with sum quenching, which have only a single commutating capacitor, the converter FIG. 6 comprises two commutating capacitors C1 and C2 each having an associated charging device. The charging device for the commutating capacitor C1 includes a transformer $U_1$ connected to an a-c voltage source, a diode $d11$ which acts as a rectifier, a resistor $r1$ and a switch S1. This charging device charges the commutating capacitor C1 in the stand-by position to a voltage with the polarity indicated, the value of the latter voltage being higher than the commutaion voltage occurring in power operation.

The charging device for the commutating capacitor C2 is similarly constructed and includes a transformer $U_2$, a diode $d12$, a resistor $r2$ and a switch S2. If the resistance values of $r1$ and $r2$ are chosen to be appropriately large, the switches S1 and S2 of the charging device can be dispensed with. In such case, the two commutating capacitors would then be connected to the charging devices in normal, as well as, emergency, operation. However, to provide a clearer explanation of the principles of the invention, operation of the charging device will be described assuming the presence of the switches S1 and S2, which are opened upon a starting command.

The commutating capacitors C1 and C2 are designed so that each has only half the capacity that would be required for sum quenching with a single commutating capacitor. Thus, the additional circuitry needed as a result of their use is justifiable. The capacity of the commutating capacitors is determined from the rated power of the converter and the currents in the valves.

The circuit arrangement of FIG. 6 is also provided with controlled auxiliary valves $n11$ to $n14$. Through suitable control of these auxiliary valves, one of the two commutating capacitors C1 or C2 can be switched to the particular main valve which is to be extinguished for the first commutation. For the following commutations, the two commutating capacitors can be operated in parallel through appropriate control of the auxiliary valves.

Figure 7:
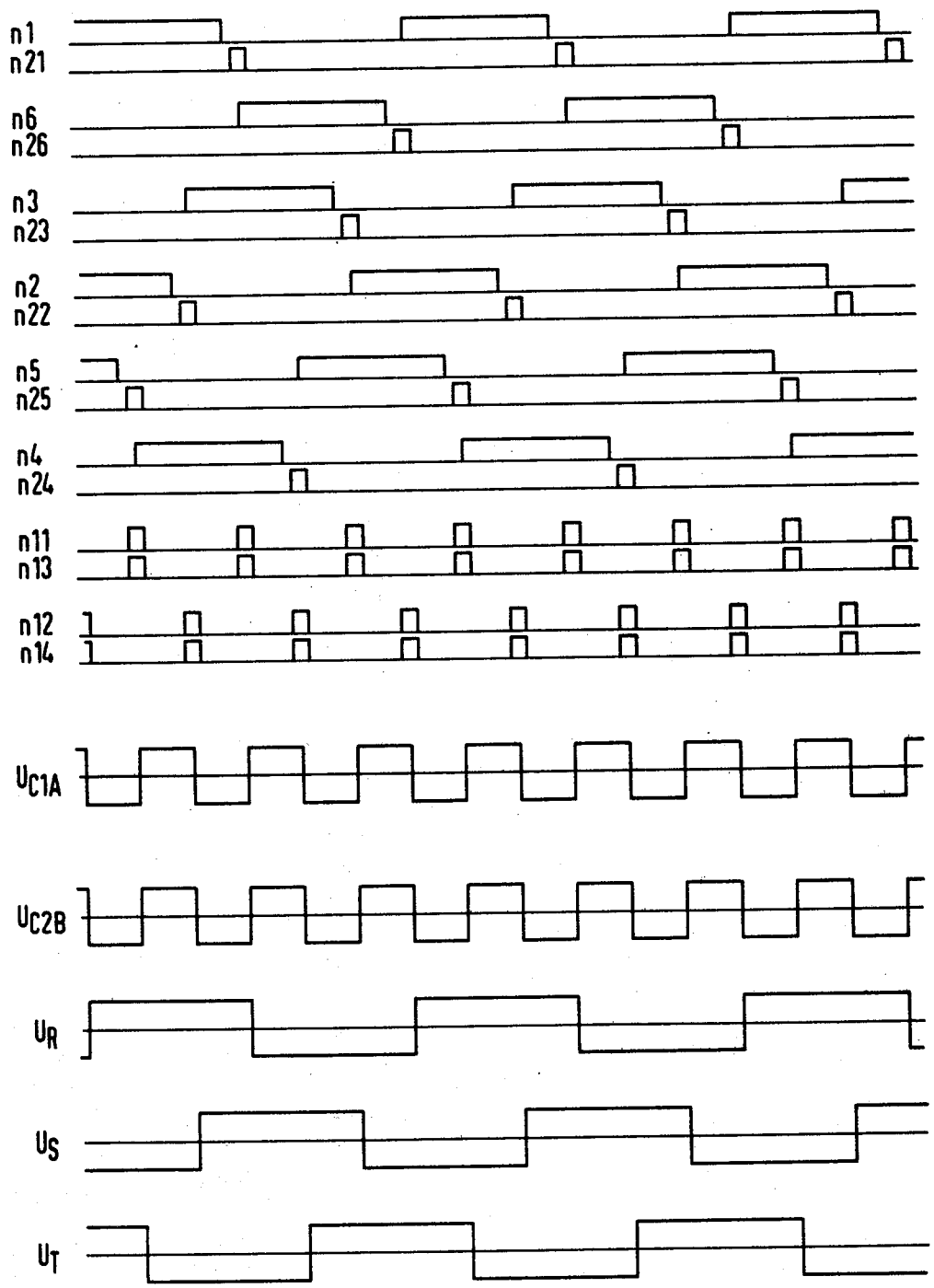
FIGS. 7 to 9 illustrate typical waveform appearing in the converter of FIG. 5.

FIG. 7 shows firing pulses for the normal operation of the inverter of FIG. 6. In particular the firing pulses for the controlled main valves n1 to n6, the controlled auxiliary valves n11 and n13 are illustrated. As can be seen, the quenching valves are always fired subsequently to the conduction period of the associated main valves. The pair of auxiliary valves n11 and n13 are always fired together, as are the pair of auxiliary valves n12 and n14, each pair being fired simultaneously with one of the quenching valves n21 to n26. More specifically, the auxiliary valves n11 and n13 are fired simultaneously with the quenching valves n21, n23, n25 associated with the main valves n1, n3, n5, while the auxiliary valves n11 and n14 are always fired simultaneously with the quenching valves n22, n24, n26 associated with main valves n2, n4, n6. In this manner, the two commutating capacitors C1 and C2 are connected in parallel during the commutation processes and, therefore, act as a single commutating capacitor for sum quenching. The voltage waveforms $U_{C1A}$ and $U_{C2B}$ at the points A and B, therefore, have the identical waveforms as shown.

FIG. 7 also shows the phase voltages $U_R$, $U_S$ and $U_T$ of the converter of FIG. 6, the latter voltages having a well known square-wave waveforms.

Figure 8:
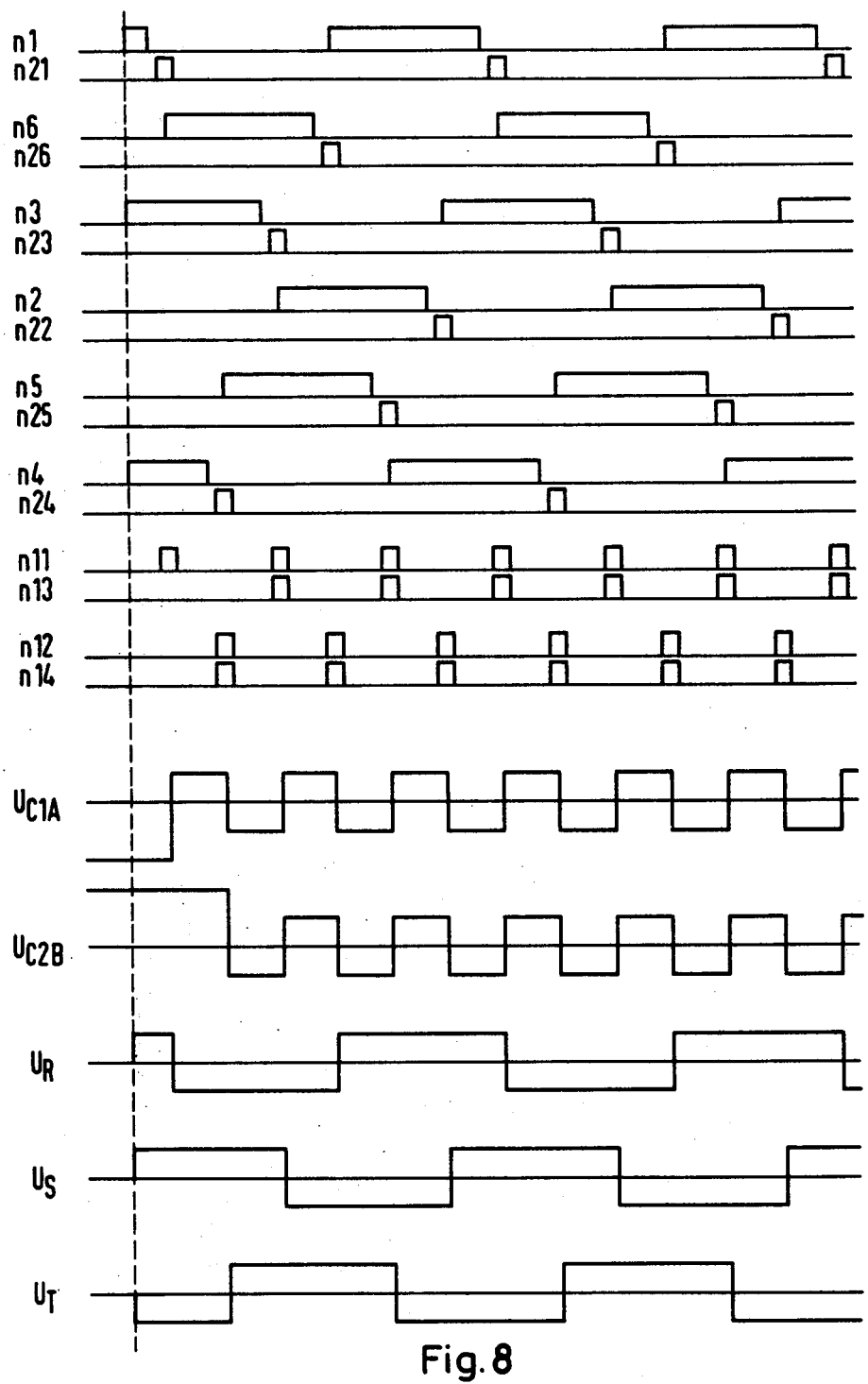

FIG. 8 shows the firing pulses for obtaining a fast start-up of the converter of FIG. 6 with the correct phase at the point in time marked by the vertical dashed line. It is assumed in the following discussion that the drive unit 8 of feeding the converter can be synchronized without delay, with the three-phase line voltage of the power system 4 in the event of a failure of the system. It has also been assumed that such synchronization requires that the phase voltages $U_R$ and $U_S$ have positive polarity at the starting instant and that the phase voltage $U_T$ has negative polarity at the starting instant.

Prior to starting, the two commutating capacitors C1 and C2 are charged in the stand-by position with different polarities, as the waveforms of the voltages $U_{C1A}$ and $U_{C2B}$ at the points A and B make clear. The pre-charge voltage is higher than the voltage occurring during operation of the inverter.

At the starting instant, the firing pulses of drive unit 8 are released to all valves with the exception of the valve n13. As a result, the main valves n1, n3 and n6 are fired. The first commutation process takes place at the main valve n1 through the firing of the associated quenching valve n21. At the same time, also the auxiliary valve n11 is fired. Thus, the commutating capacitor C1 is effective for the first commutation. For all subsequent commutation processes, the auxiliary valves n11 and n13 or n12 and n14, respectively, are then fired together. Consequently, the commutating capacitors C1 and C2 operate in parallel during the subsequent commutation processes and thus function as a single commutating capacitor for sum quenching.

Figure 9:
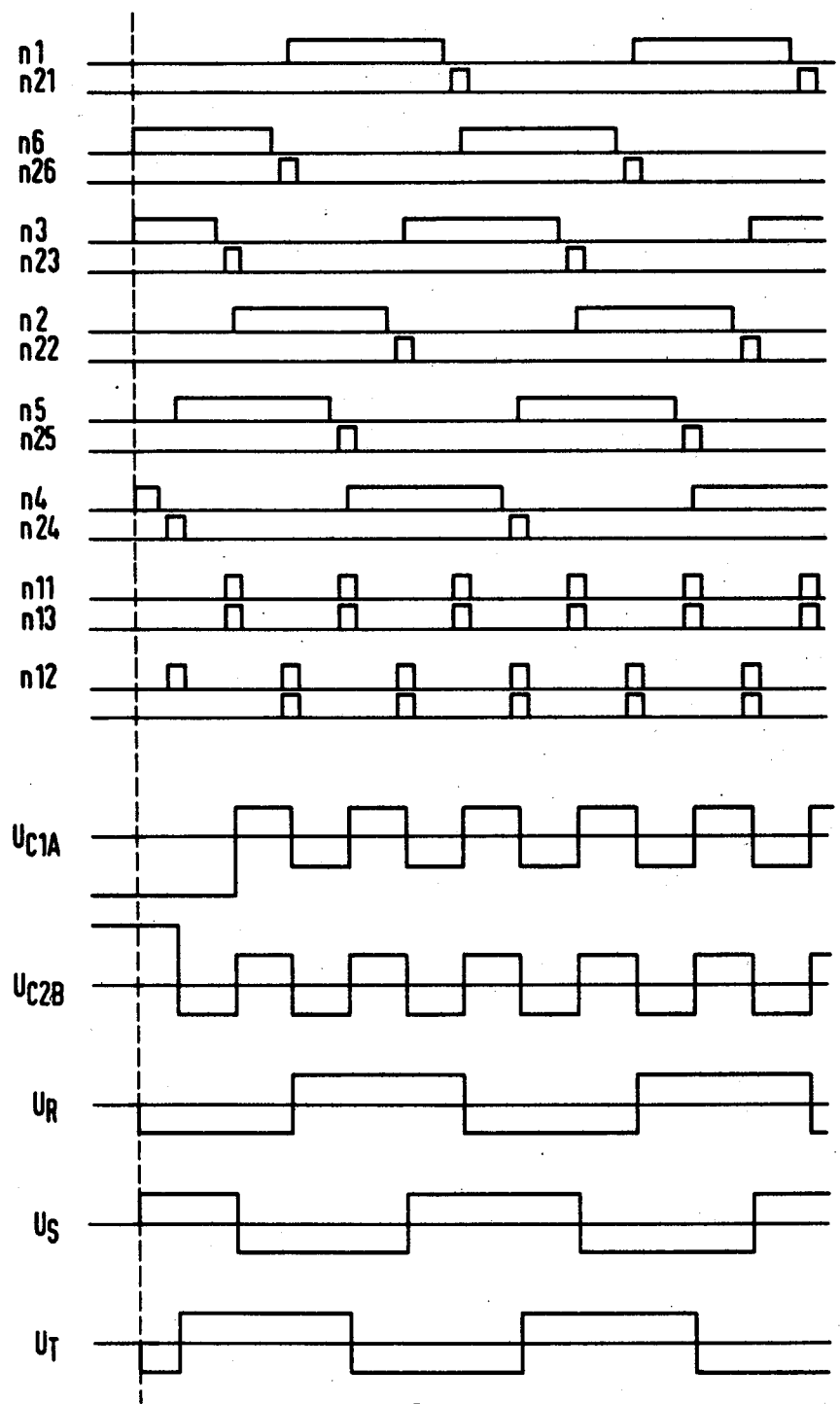

In FIG. 9, the firing pulses for the inverter of FIG. 6 are shown for the case in which the voltages $U_R$ and $U_T$ are to have a negative polarity and the phase voltage $U_S$ a positive polarity at the starting instant. In this case, the first commutation takes place at the main valve n6 by firing the associated quenching valve n26. Simultaneously with the quenching valve n26 the auxiliary valve n14 is fired. The first commutation of the main valve n6, therefore, takes place with the aid of the capacitor C2. In all subsequent commutation processes, the auxiliary valves n11 and n13 or n12 and n14, respectively, are again fired together. Thus, the two commutating capacitors operate in parallel for all subsequent commutation processes and thus again, act as a single commutating capacitor for sum quenching.

Figure 10:
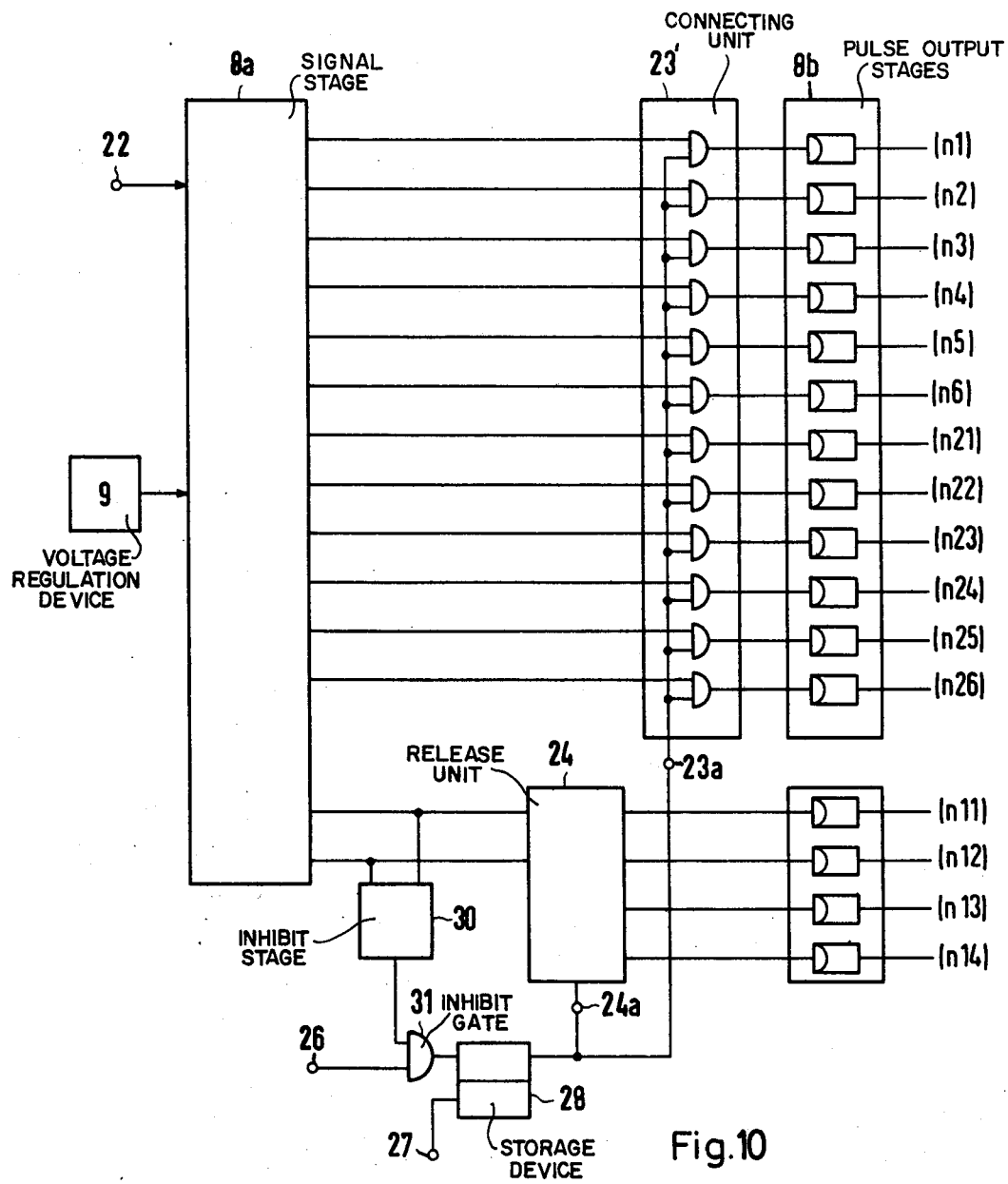
FIG. 10 shows in greater detail the portion of the circuit arrangement of FIG. 5 for controlling firing pulses for the converter of the circuit.

FIG. 10 shows in greater detail the portion of the circuit of FIG. 5 which controls the generation of the firing pulses shown in FIGS. 8 and 9.

As shown, the signal stage 8a and pulse output stages 8b forming part of the drive unit 8 of FIG. 5 are fed by the voltage regulation device 9 which determines the firing angle of the firing pulses of the unit.

The firing pulses of the signal 8a for the controlled main valves n1 to n6 and the controlled quenching valve n21 to n26 in the valve branches of the converter are coupled through the connecting unit 23' and appear at the outputs of the output stage 8b. The valves fed by the aforesaid outputs are indicated, in parantheses adjacent their respective outputs. The firing pulses for the controlled auxiliary valves n11 to n14 in turn, are coupled through the release unit 24. As in the embodiment of FIG. 2, the latter unit and the connecting unit 23 are arranged ahead of their respective amplifier output stages so that the signal processing can be performed at a low power level.

In the stand-by position of the convert 5, the signal stage 8a and the regulating device 9 are operative. However, at this time, the transmission of the firing pulses to the controlled main valves n1 to n6 and to the controlled quenching valves n21 to n26 is blocked by the connecting unit 23', while the transmission of the firing pulses to the controlled auxiliary valves n11 to n14 is blocked by the release unit 24.

In order to ensure that the firing pulses are released during a commutation process or immediately before a commutation process, an inhibit stage 30 is also provided. The inhibit stage 30 may be acted upon either by the firing pulses generated for the controlled quenching valves n21 to n26 or, as shown, by the simultaneously generated firing pulses for the controlled auxiliary valves n11 to n14.

If the command stage 25 transmits a starting command to the terminal 26, the setting input of the storage device 28 is addressed via an inhibit gate 31, provided the inhibit stage 30 is not generating an inhibit signal. If the inhibit stage 30 is generating an inhibit signal, the device 28 can be set only when this inhibit signal disappears. The output signal of the storage device 28 is connected to the input 24a of the release unit 24 and to the input 23a of the connecting unit 23' and when appropriately set, releases the two units. Storage device 28 can also be reset by a resetting signal applied to its lower input terminal 27, for example, if the converter is to be stopped.

Figure 11:
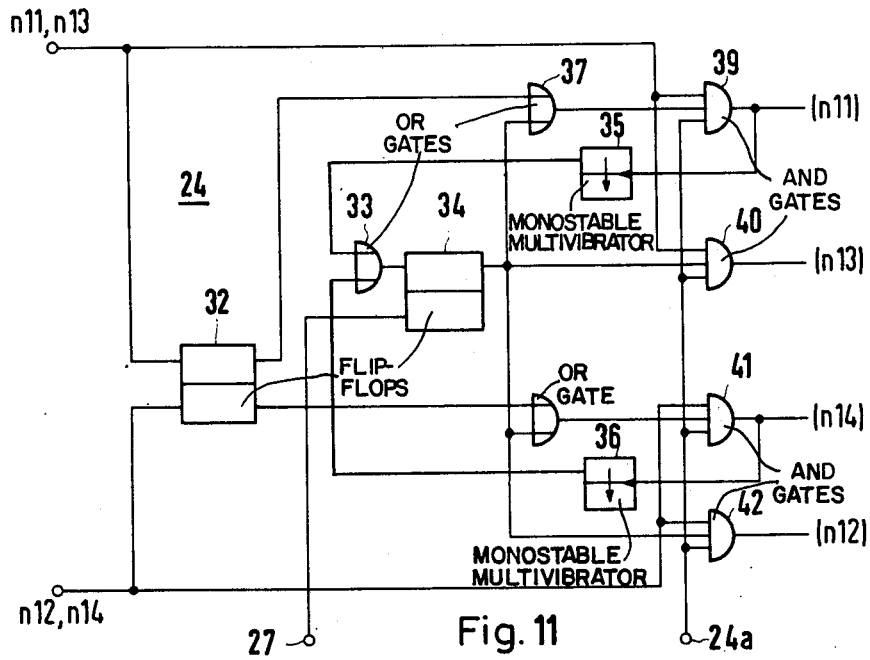
FIG. 11 illustrates the release unit of the converter of FIG. 5 in more detail.

FIG. 11 shows an illustrative circuit configuration for the release unit 24. As discussed above, in emergency operation, as in power operation, the pairs of controlled auxiliary valves n11, n13 and n12, n14, respectively, are fired simultaneously, the drive unit 8 forming one set of firing pulses for the respective pair of auxiliary valves n11, n13 and one set of firing pulses for the respective pair of auxiliary valves n12, n14. As indicated, sets of these firing pulses are fed as inputs to the release unit 24.

The firing pulses for the pairs of auxiliary valves n11, n13 and n12, n14, respectively, determine the polarities of the voltages at the two commutating capacitors C1 and C2 during power operation of the converter 5. These firing pulses are fed, respectively, to the setting input and resetting inputs of flipflop 32. The output signals of the flipflop 32, therefore, have waveforms which correspond to the waveforms of the polarities of the capacitor voltages. If, for example, the upper output of the flipflop 32 carries a "1" signal, the capacitor voltage at the points A and B (FIG. 6) is positive in power operation of the converter. If, on the other hand, the lower output of the flipflop 32 carries a "1" signal, then the capacitor voltage at the points A and B is negative. Moreover, when the signal at the upper output of the flipflop 32 changes from a "0" signal to a "1" signal then the capacitor voltage changes from negative to positive. In the latter case, only the auxiliary valve n11 need be fired for the first commutation, if the capacitors C1 and C2 are pre-charged as shown in FIG. 6. This firing of the valve n11 only is accomplished by the logic circuit following the flipflop 32. Such circuit includes a further flipflop 34 which is reset prior to the start of converter 5 by a reset signal at its resetting input 27. The output of the flipflop 34 is, therefore, a "0" signal in the stand-by position.

If the drive unit 8a delivers a "1" signal as the firing pulse for the auxiliary valves n11, n13, the flipflop 32 is set. Its upper output thus carries a "1" signal which is coupled via an OR gate 37 to one of the inputs of an AND gate 39, the output of the latter gate being used to feed the control path of the auxiliary valve n11. If a "1" signal is already present as a release signal at the input terminal 24a, a firing pulse is applied to the control path of the valve n11. However, at this time no firing pulse is applied to the control path of the auxiliary valve n13, as the flipflop 34 is not set and, therefore, the middle input of the AND gate 40 is not being appropriately addressed.

The firing pulse being fed to the auxiliary valve n11 is also fed to the pulse input of a monostable multivibrator 35. The decaying flank at the end of the firing pulse causes the monostable multivibrator 35 to deliver a pulse which sets the flipflop 34 via an OR gate 33. The setting of the flipflop 34 then causes the middle and lower inputs of the AND gates 39 and 40, as well as 41 and 42, to be continuously set at "1" signals. As a result, at the outputs of these gates will now appear the respective firing pulses for the auxiliary valves n11 to n14 being delivered by the drive unit.

If at another starting instant the flipflop 32 happens to be, for example, in the reset state then the auxiliary valve n14 is fired first for the first commutation in an analogous manner as discussed for the valve n11. In this case, at the end of the firing pulse for the auxiliary valve n14, the flipflop 34 is now set via a further monostable multivibrator 36 and the OR gate 33. Subsequently, the firing pulses being supplied for the auxiliary valves n11 to n14 by the drive unit are connected through uninhibited to the AND gates 39 to 42 until a reset signal for the flipflop 34 appears at the terminal 27.

Figure 12A:
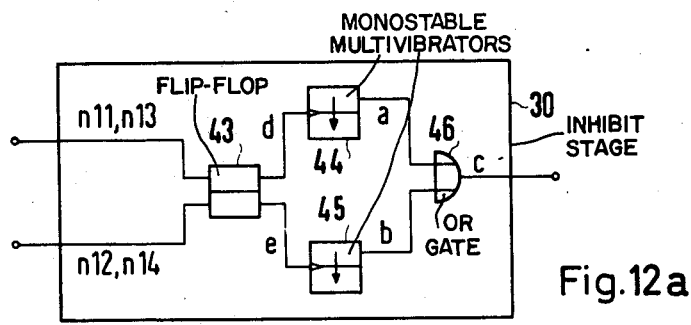
FIG. 12 shows an inhibitor stage which can be employed in the converter of FIG. 5.
Figure 12B:
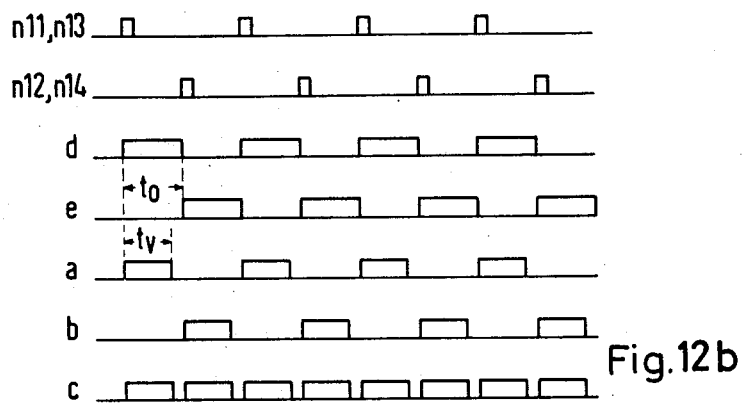

FIG. 12a shows a circuit arrangement which can be employed for inhibit stage 30. As shown, the firing pulses for the controlled auxiliary valves n11, n13 are applied to the setting input and the firing pulses for the controlled auxiliary valves n12, n14 to the resetting input of a flipflop 43. The waveforms of the resultant output signals $d$ and $e$ of the flipflop 43 are shown in FIG. 12b. The output signals $d$ and $e$ are used to trigger monostable multivibrators 44 and 45, respectively, which deliver pulse signals $a$ and $b$ comprising pulses of width $t_v$. As can be seen, the pulse width $t_v$ is shorter than the halfperiod $t_o$ of the signals $d$ and $e$. The signals $a$ and $b$ are fed to the inputs of an OR gate 46. The OR gate 46, in turn, produces from the two signals $a$ and $b$, a signal $c$ which always has the signal state "1" shortly before the start of every commutation process and, therefore, blocks the converter 5 from being started during these intervals.

Figure 13A:
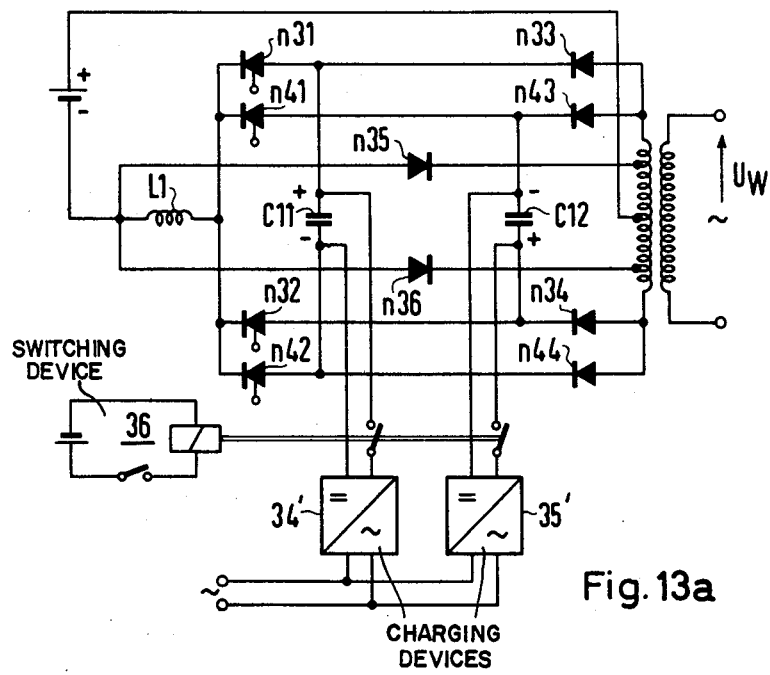
FIG. 13a illustrates another circuit arrangement which can be employed as the converter of FIG. 5.

FIG. 13a illustrates an embodiment of a single-phase converter which can be employed as the converter of an arrangement similar to that shown in FIG. 5. In the converter of FIG. 13a bridge arms with parallel-connected valves are provided for each of the output voltages in order to increase the rated power of the converter. More specifically, the converter comprises an upper bridge arm which includes the series connection of a main valve n31 and a series diode n33 and the parallel-connected series circuit of a main valve n41 and a series diode n43. Simmilarly, the converter also comprises a lower bridge arm which includes the series connection of a main valve n32 and a series diode n34 and the parallel-connected series circuit of a main valve n42 with a series diode n44. With this configuration, the main valves n31 and n41, as well as the main valves n32 and n42, are always fired simultaneously and together. Moreover, the main valves also provide the function provided by the auxiliary valves of the previous converters of connecting the two commutation capacitors C11 and C12 into the circuit. Thus the converter of FIG. 13a causes no extra expenditure for valves.

The converter of FIG. 13a also includes by-pass diodes n35 and n36 and a commutating inductance L1 which are arranged in a conventional manner. Additionally, the capacitors C11 and C12 of the inverter are provided with associated charging devices 34' and 35' which can be disconnected, in the event of a starting command, by a switching device 36'.

Figure 13B:
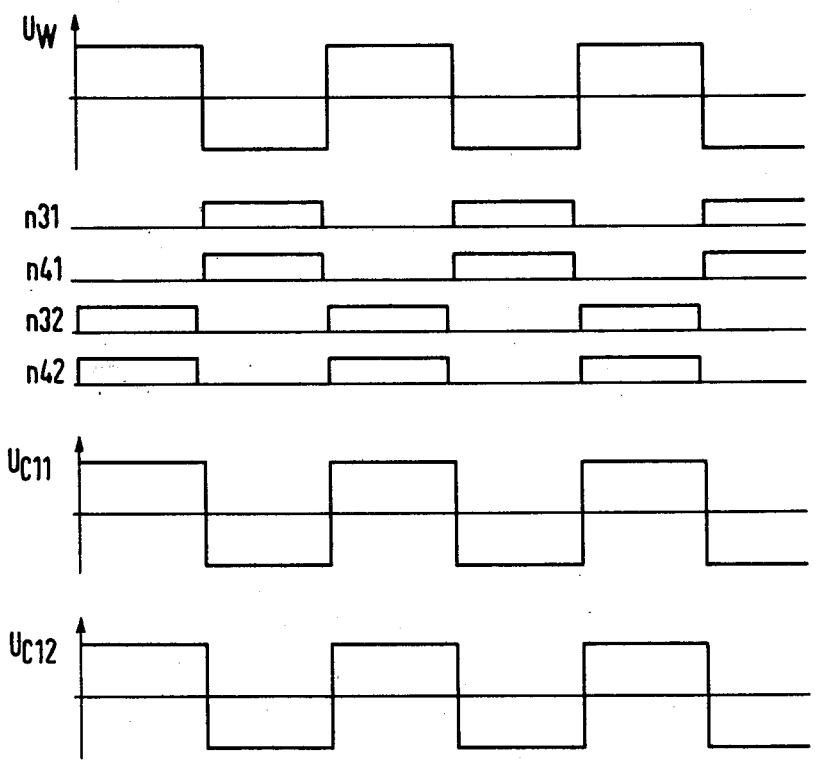

FIG. 13b shows the waveform of the output voltage $U_W$ of the converter of FIG. 13a for normal operation, as well as the pulse waveforms for the firing pulses of the controlled main valves n31, n41 and n32, n42 and the waveforms of the voltages $U_{C11}$ and $U_{C12}$ at the commutating capacitors C11 and C12.

Figure 13C:
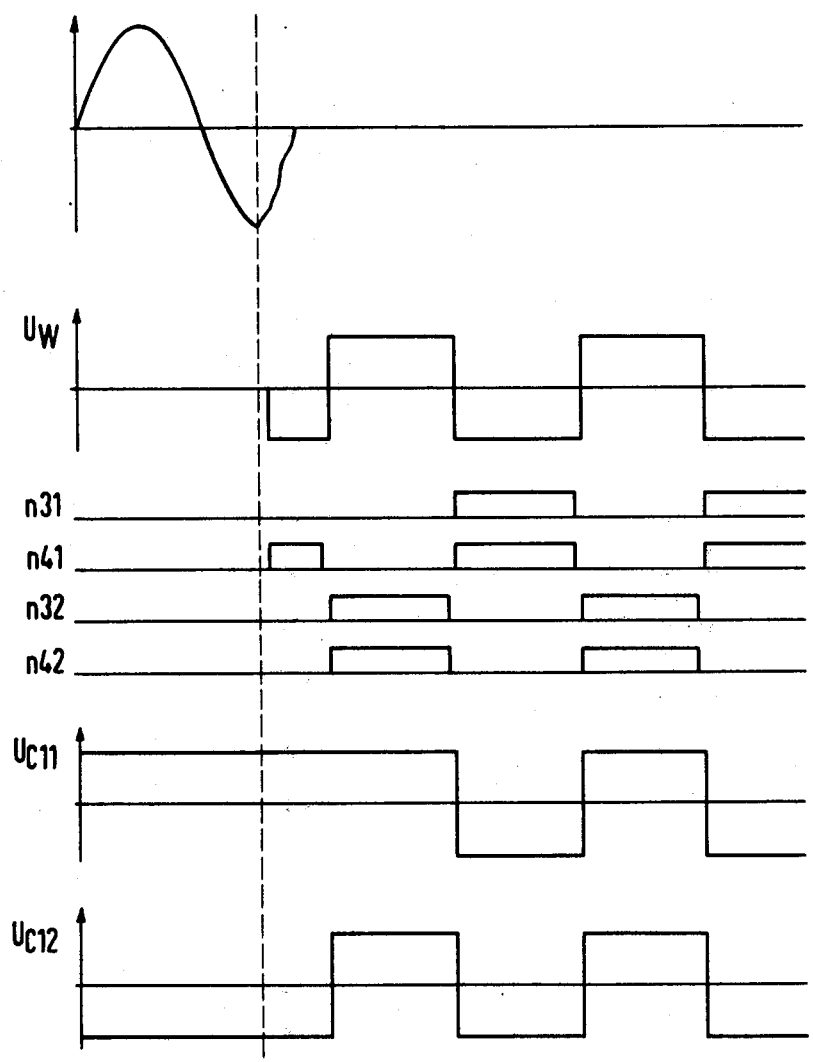

FIG. 13c shows waveforms of FIG. 13b during a cycle of the starting-up of the converter of FIG. 13a when it is used in circuit arrangement similar to that shown in FIG. 5. As can be seen from the waveforms, the commutating capacitors C11 and C12 are charged in the stand-by position with opposite polarities to a normal commutation voltage. During the first commutation after the start, only one of the two commutating capacitors is effective, the commutating ability of the converter during the first commutation being thereby somewhat reduced. Such a reduction is, however, permissable for suitable applications.

As indicated, the line voltage $U_N$ (top waveform in FIG. 13c ) breaks down in the negative half-wave. At the time of such breakdown, a starting command voltage of negative polarity is applied to the converter. With the starting command, the drive unit firing pulses which have been generated in stand-by position are now appropriately released with the exception of the firing then present firing pulse for the main valve n31. The output voltage $U_W$ of the inverter is thereby caused to take on the required negative polarity by way of the first commutation which takes place with the charge of the commutating capacitor C12. Thereupon, the two commutating capacitors C11 and C12 operate in parallel.

Figure 13D:
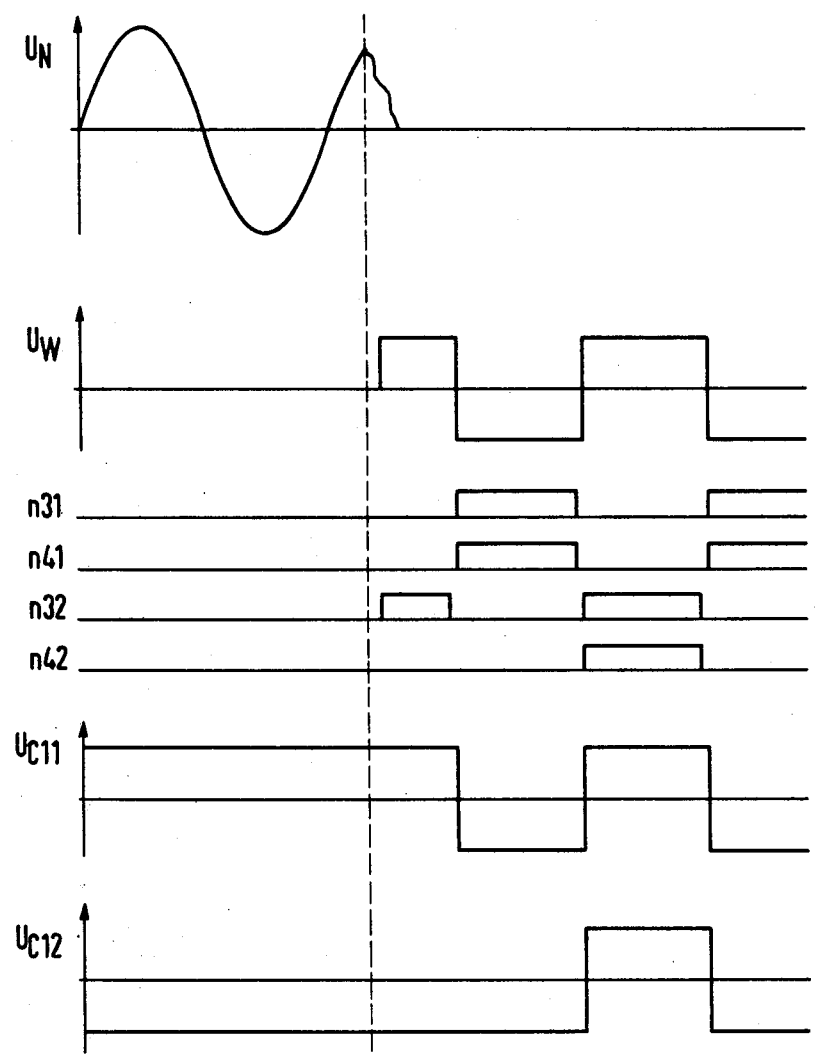

Similarly, FIG. 13d shows the waveforms of FIG. 13b during a start-up of the converter of FIG. 13a for a breakdown of the line voltage $U_N$ during a positive half-wave. Upon a starting command, the firing pulses are released with the exception of the then present firing pulse for the main valve n42. The first commutation takes place with the charge of the capacitor C11. Thereupon, the two commutation capacitors C11 and C12 operate in parallel.

Figure 13E:
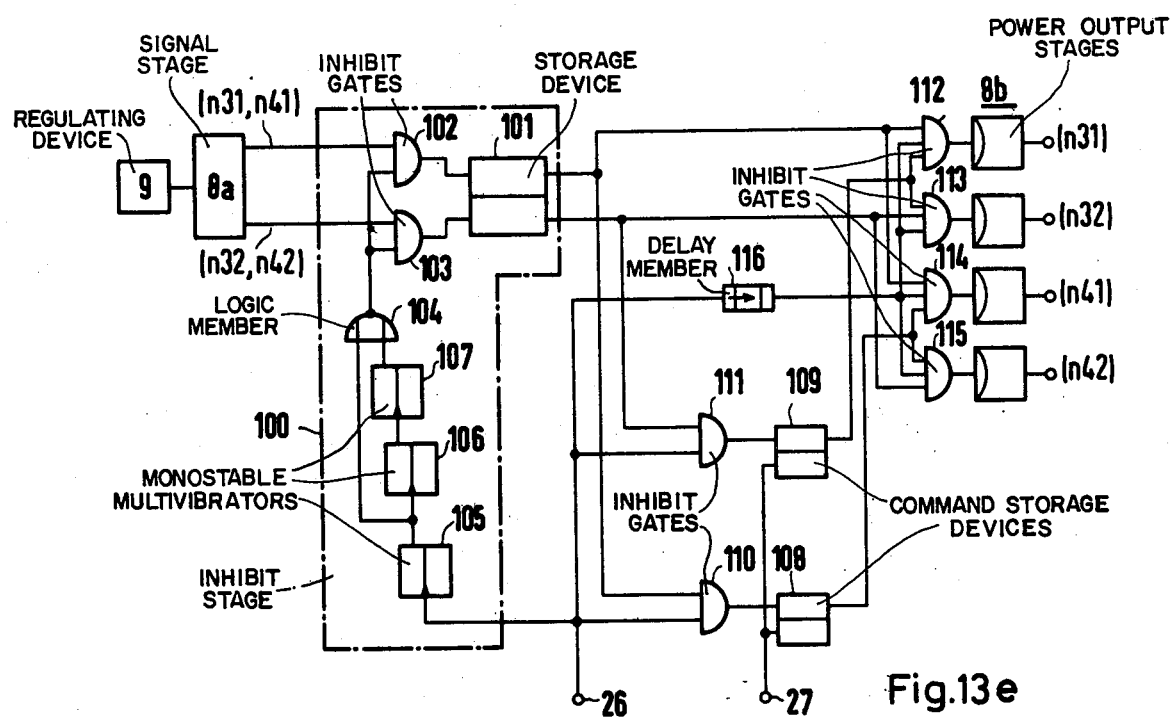
FIG. 13e shows a circuit arrangement for controlling the converter of FIG. 13a to realize the waveforms of FIGS. 13c and 13d.

In FIG. 13e a circuit arrangement for controlling the converter of FIG. 13a so as to realize the waveforms of FIGS. 13c and 13d is shown. In FIG. 13e, as in the prior cases, a drive unit is provided which is subdivided into a signal stage 8a and into power output stages 8b. The signal stage 8a is synchronized in a known manner with an a-c voltage system and is fed by regulating device 9 similar to those previously discussed. As the parallel-connected main valves n32, n42 and n32, n42 are always fired simultaneously and together, the signal stage 8a of the drive unit generates common firing signals for n31, n41 and for n32, n42. These firing signals are amplified in the power output stages 8b and coupled therefrom to the respective main valves whose reference symbols are indicated in parantheses.

An inhibit stage 100 prevents commutations from following each other excessively fast, immediately after the starting instant. The inhibit stage 100 includes a storage device 101 whose inputs are fed the outputs of inhibit gates 102 and 103. The inhibit gates 102, 103 can be switched into conduction or can be cut-off by the output signal of a logic member 104, which member is preceded by a delay circuit comprised of three monostable multivibrators 105, 106, 107. The first monostable multivibrator 105 has a pulse duration which is longer than the duration of one commutation and which is approximately 1.5 times the duration of one commutation. The second monostable multivibrator 106 has a pulse width which is substantially shorter than the duration of one commutation, e.g., 1/100 of the duration of one commutation and is, for instance, again 1.5 times as long as the duration of one commutation.

In operation, the positive flank of a starting signal at the terminal 26 releases a pulse from the monostable multivibrator 105 which for its duration blocks new firing pulses from being taken into the storage device 101. The decaying flank of the pulse of the monostable multivibrator 105, in turn, triggers the release of the pulse of the multivibrator 106. For the duration of such pulse, new firing pulses can now be transferred into the storage device 101. The decaying flank of the pulse of the monostable multivibrator 106 then triggers the monostable multivibrator 107, whose output pulse again inhibits the transfer of new firing pulses into the storage device 101. At the end of the latter pulse, the transfer of new firing pulses into the storage device 101 is released indefinitely. As can be appreciated, the inhibit stage 100 is advantageous for converters which are controlled by means of firing pulse control methods. Moreover, the stage 100 can in some cases be simplified in such a manner that the monostable multivibrators 106 and 107, as well as the logic member 104, are omitted. In these cases, the transfer is blocked only during the pulse of the monostable multivibrator 105.

In the circuit of FIG. 13e, two command storage devices 108 and 109 are also provided. The setting input of the command storage device 108 is fed, via an inhibit gate 110, by the firing signals for the valves n31, n41, appearing at the upper output of the storage device 101. The setting input of the command storage device 109, on the other hand, is fed, via an inhibit gate 111, by the firing signals for the valves n32, n42. The command storage devices 108 and 109 can additionally be reset by a reset signal at the further input terminal 27, for example, if the converter is to be stopped.

Upon application of starting command at the terminal 26, the inhibit gates 112 to 115 feeding the power output stages 8b of the drive unit are released by the output signal of a time-delay member 116 having a very short delay time. The time delay member 116 ensures that the release takes place only if the command storage devices 108 and 109 are set. If the output stages 8b of the drive unit have sufficient response delay, the delay member 116 can be omitted.

In the starting-up cycle shown in FIG. 13c, a firing pulse for the valves n31, n41 is present at the starting instant and sets the storage device 101. The upper output of the storage device 101 thus carries a firing pulse which arrives at the upper inputs of the inhibit gates 112 and 114. The inhibit gate 110, in turn, is brought into conduction by the starting command and the command storage device 108 is thereby set. The setting of the command storage device 108 causes its output to place the inhibit gate 114 in the conducting state. The output stage following the inhibit gate 114 thereby receives a firing pulse, as the command storage device 109 is not set. After the first commutation, a firing signal appears for the valves n32, n42. Unless the inhibit stage 100 blocks the new firing pulses from being transferred into the storage device 101, the storage device 101 is reset. The inhibit gate 111 is then made to conduct by the starting command. The command storage device 109 is then set. The output signal of the command storage device 109 places the inhibit gates 112 and 113 in the conducting state. The controlled valves are acted upon by the firing pulses in the usual manner. If the inhibit stage 100 delays the transfer of new firing pulses for a specified time, the starting-up cycle described proceeds thereafter in the same manner. The inhibit stage 100 thus only has the function to see to it that the minimum time between the start and the first commutation and, as the case may be, between a first and second commutation does not fall below a permissible value.

In the starting-up cycle shown in FIG. 13d, the firing pulses for the valves n32, n42 are first present at the output of the storage device 101. In this situation, the starting command places the inhibit gate 111 in the conducting state and the command storage device 109 is thereby first set. The setting of the storage device 109, in turn, causes the inhibit gates 112 and 113 to conduct. As a result, the output stage following the inhibit gate 113 receives a firing pulse for the valve n32. At this time, the valve n42 does not yet receive a firing pulse, as the inhibit gate 115 is still cut off. After the first commutation the inhibit gate 110 is caused to conduct the command storage device 108 is then set and the inhibit gates 114 and 115 are thereby controlled into conduction.

Figure 13F:
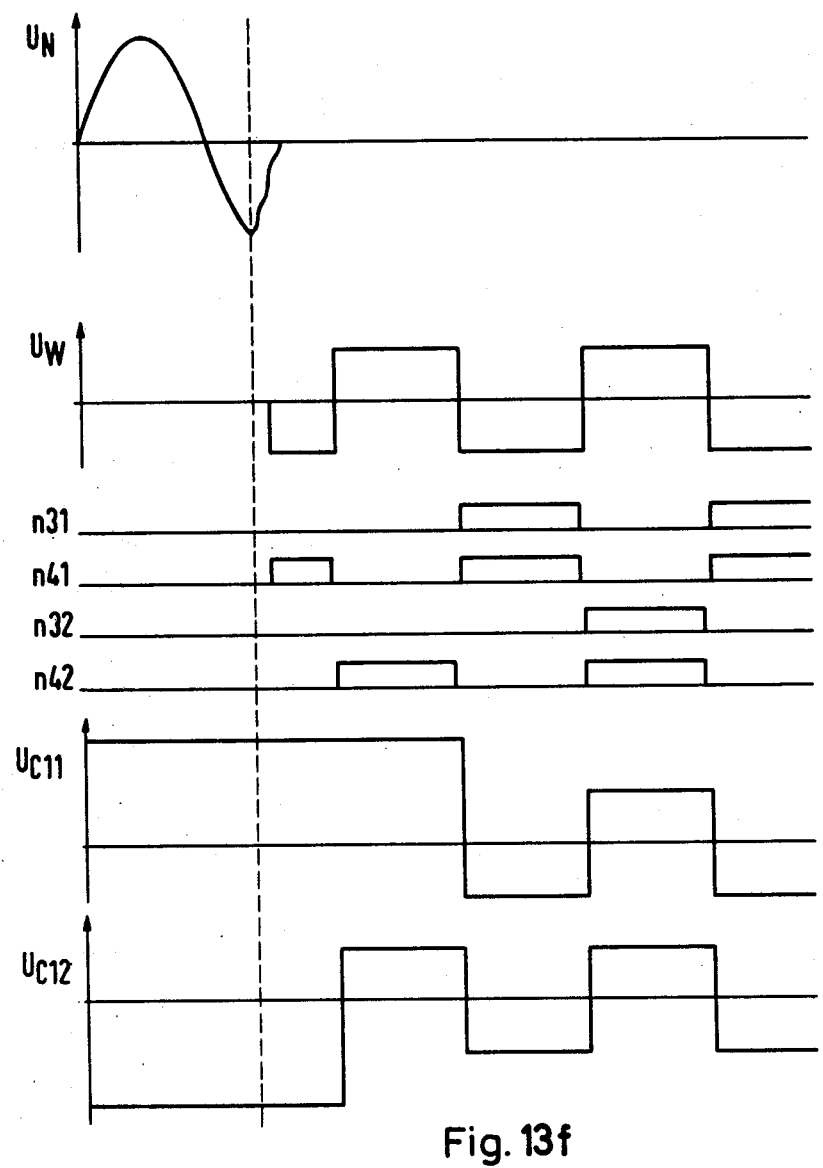

FIG. 13f shows starting-up waveforms similar to those shown in FIG. 13c, with the exception that the two commutating capacitors C11 and C12 are charged in the stand-by position to a voltage higher than that occurring in power operation. In such case, the inverter of FIG. 13a has its full commutating ability for the first commutation.

Figure 13G:
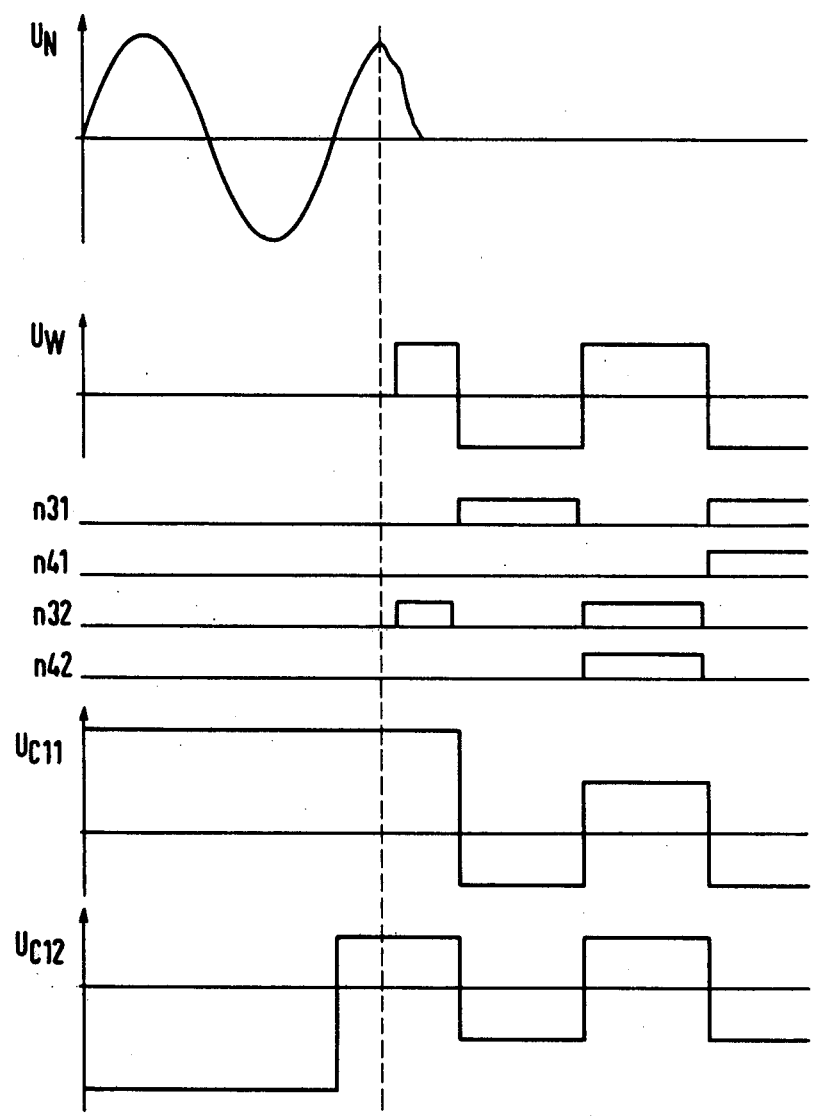

Likewise, FIG. 13g shows a starting-up waveforms similar to those depicted in FIG. 13d, with the exception that the commutating capacitors C11 and C12 are again charged in the stand-by position to a voltage which is higher than the commutation voltage occurring in operation.

Figure 13H:
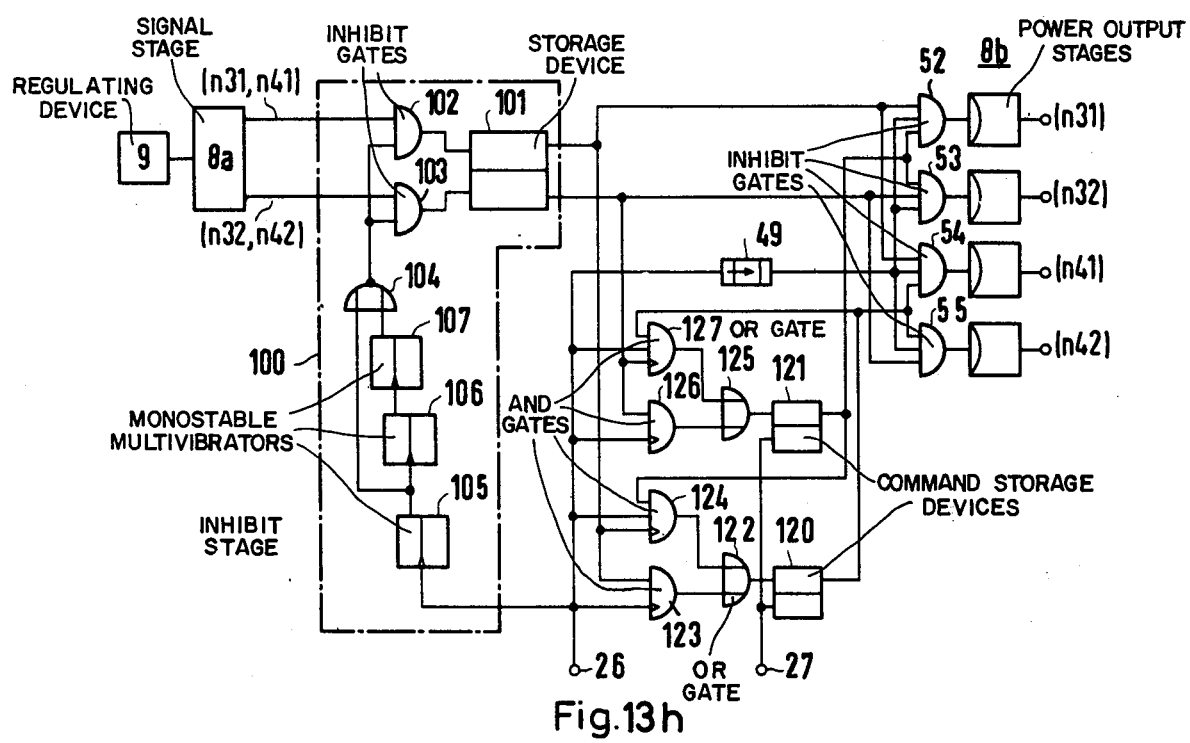
FIG. 13h illustrates a circuit arrangement for controlling the converter of FIG. 13a so as to realize the waveforms of FIGS. 13f and 13g.

A circuit arrangement for controlling the starting-up of the inverter of FIG. 13a to realize the waveforms of FIGS. 13f and 13g is shown in FIG. 13h. The circuit arrangement of FIG. 13h corresponds to that of the arrangement of FIG. 13e with the exception of the circuitry associated with the command storage devices. Mores specifically, in the circuit arrangement of FIG. 13h, two command storage devices 120 and 121 are provided. The setting input of the command storage device 120 is connected via an OR gate 122 with the output of an AND gate 123 and with the output of an AND gate 124. The device 120 is set if either the firing signals for the valves n31, n41 are present during the appearance of the starting command or if the command storage device 121 is set, the starting command is present and the rising flank of the firing signal for the valves n31, n41 appears. The setting input of the storage device 121 is similarly preceeded by an OR gate 125 and two AND gates 126 and 127. This storage device is set if the firing signals for the valves n32, n42 are present and the starting command appears or if the storage device 120 is set, the starting command is present and the rising flank of the firing signal for the valves n32, n42 appears. Additionally, the command storage devices 120 and 121 can be reset by a stop command at the further input terminal 27, for example, if the converter is to be stopped.

Figure 14:
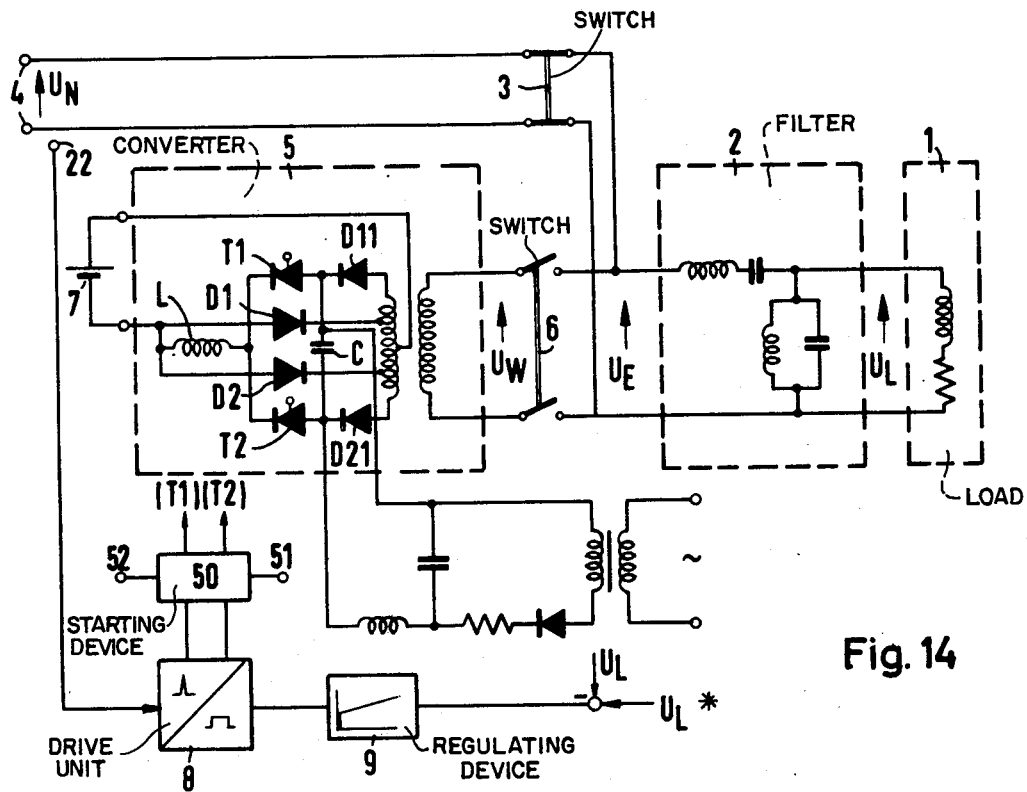
FIG. 14 shows a circuit arrangement including a converter which can be started up by means of a third embodiment of the starting-up method according to the invention.

FIG.14 shows an embodiment of a circuit arrangement in accordance with the invention which is analagous to the arrangement shown in FIG. 1. In particular, firing pulses are formed in the drive unit 8 for the converter 5. These pulses are blocked in the stand-by position by a starting device 50. Upon application of a starting command at its input terminal 51, the device 50 releases the firing pulses so that they become coupled to the controlled valves of the converter.

The converter 5 is in the form of a center-tap type bridge circuit which includes controlled main valves T1 and T2 in series diodes D11 and D21, respectively. Additionally, the converter also includes bypass diodes D1 and D2 and a commutation circuit comprising a commutating capacitor C and a commutating inductance L. For a given polarity of the aforesaid energy storage i.e., the capacitor and inductance devices, of the commutation circuit, the converter can be placed into operation only with a particular sequence of firing of the main valves T1 and T2.

For purposes of explanation, it will be assumed that the energy storage devices in the commuation circuit have been pre-charged so that the converter can be started only if a firing pulse is initially applied to the valve T1. The aforesaid precharging takes place in the stand-by position and is accomplished by charging the commutating capacitor C with a charging device similar to that described in connection with FIG. 2. The charging device charges the capacitor C with a voltage of a given polarity.

Upon a starting command at the terminal 51, the release of the firing pulses generated by unit 8 is delayed to the beginning of the next half-wave, with the polarity of the output voltage $U_W$ of the converter 5 determined by the polarity of the precharge of the commutating capacitor C. This procedure assumes that the converter 5 is started with the correct phase. The maximally possible delay is one period of the a-c voltage.

Figure 15:
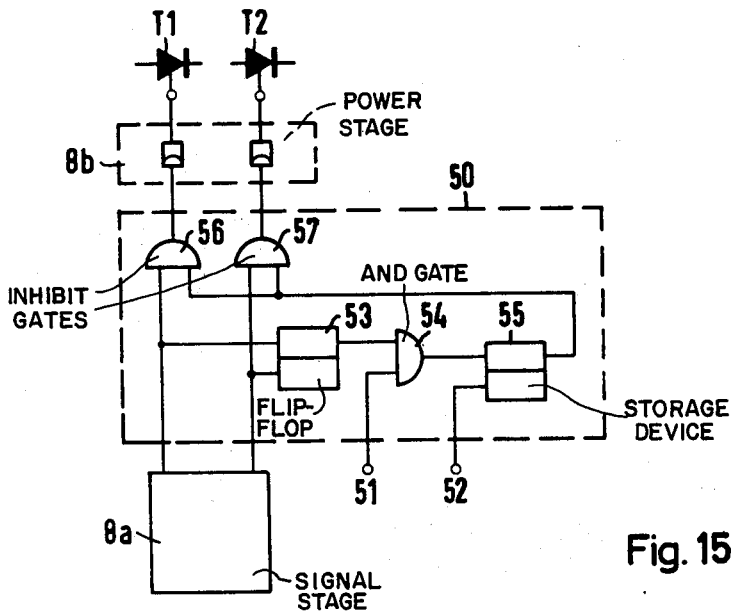
FIG. 15 illustrates in greater detail the starting unit employed for the converter of FIG. 14.

FIG. 15 shows in schematic fashion a circuit arrangement for performing the function of starting device 50. The starting device 50 is again connected between the signal stage 8a and the power output stages 8b of the drive unit 8, so that the signal processing can be performed at a low power level. As shown, the starting device 50 includes a flipflop 53 which is fed by the firing pulses for the valve T1 at its setting input and by the firing pulses for the valve T2 at its resetting input. The polarity of the output signal of the flipflop 53, therefore, changes in the same manner that the polarity of the output voltage of the converter 5 would change, if the firing pulses of the drive unit 8 were being applied to the controlled valves T1 and T2.

Following the flipflop 53 is an AND gate 54 whose output sets a storage device 55, if a starting command appears at its lower input and a flank of the output signal of the flipflop 53 appears at its upper (dynamic) input. The storage device 55 is, therefore, set only if a tarting command is present and a change in the output signal of the flipflop 53 is occurring. In the present illustrative case, this condition occurs only during a positive flank of the output signal of the flipflop 53, i.e., when it is changing from a "0" signal to a "0" signal. This means storage device 55 is initially set only when the firing pulses being delivered by unit 8 are such as to fire the controlled valve T1. The setting of the output signal of the storage device 55 causes the two inhibit gates 56 and 57 to conduct, thereby releasing the then present firing pulses to values of the converter 5.

The storage device 55 can also be reset by application of a reset command at its input 52. This can take place, for example, when the load 1 is connected to the converter.

Figure 16:
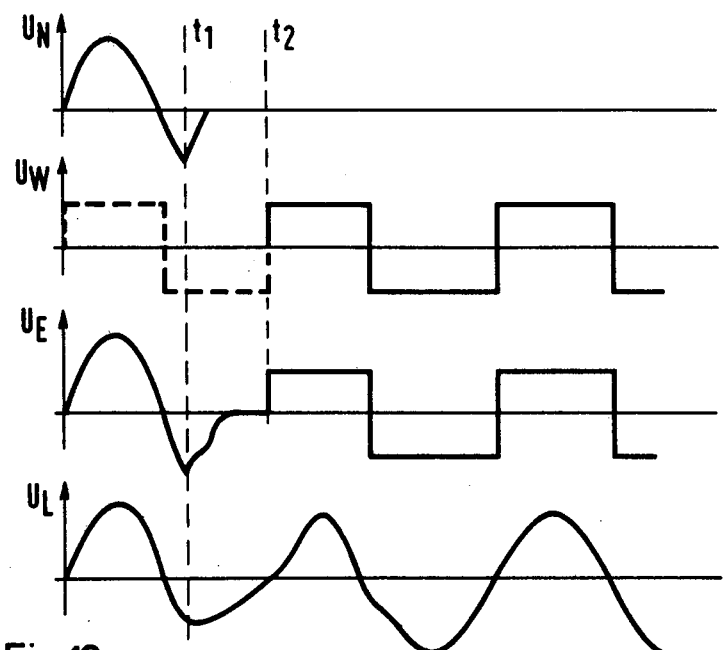
FIGS. 16 and 17 show waveform diagrams for a starting-up process of the converter of FIG. 14.
Figure 17:
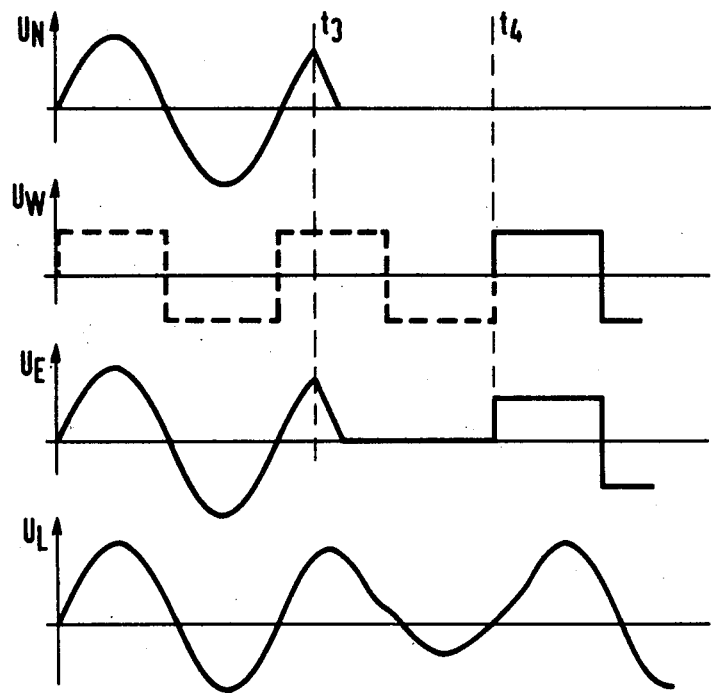

FIGS. 16 and 17 show the waveforms of the line voltage $U_N$, the converter output voltage $U_W$, the input filter voltage $U_E$ and the load voltage $U_L$ during emergency operation, e.g., failure of the line voltage $U_N$ of the circuit arrangement of FIG. 14. As above-discussed, in arriving at such waveforms it has been assumed that the energy storage devices in the commutation circuits of the converter 5 are pre-charged in such a manner that the converter 5 can be started so as to realize a positive polarity of its output voltage.

In FIG. 16, the line voltage $U_N$ breaks down during its negative half-wave at the time $t_1$. The release of the firing pulses for the converter is delayed up to the time $t_2$. At such time the next positive half-wave of the output voltage $U_W$ of the converter 5 is set to begin and the converter is then started.

In FIG. 17, the line voltage $U_N$ breaks down during its positive half-wave at the time $t_3$. The release of the firing pulses in this case is delayed up to the time $t_4$, when the next positive half-wave of the output voltage $U_W$ of the converter begins. At the time $t_4$ the converter is then started.

Figure 18:
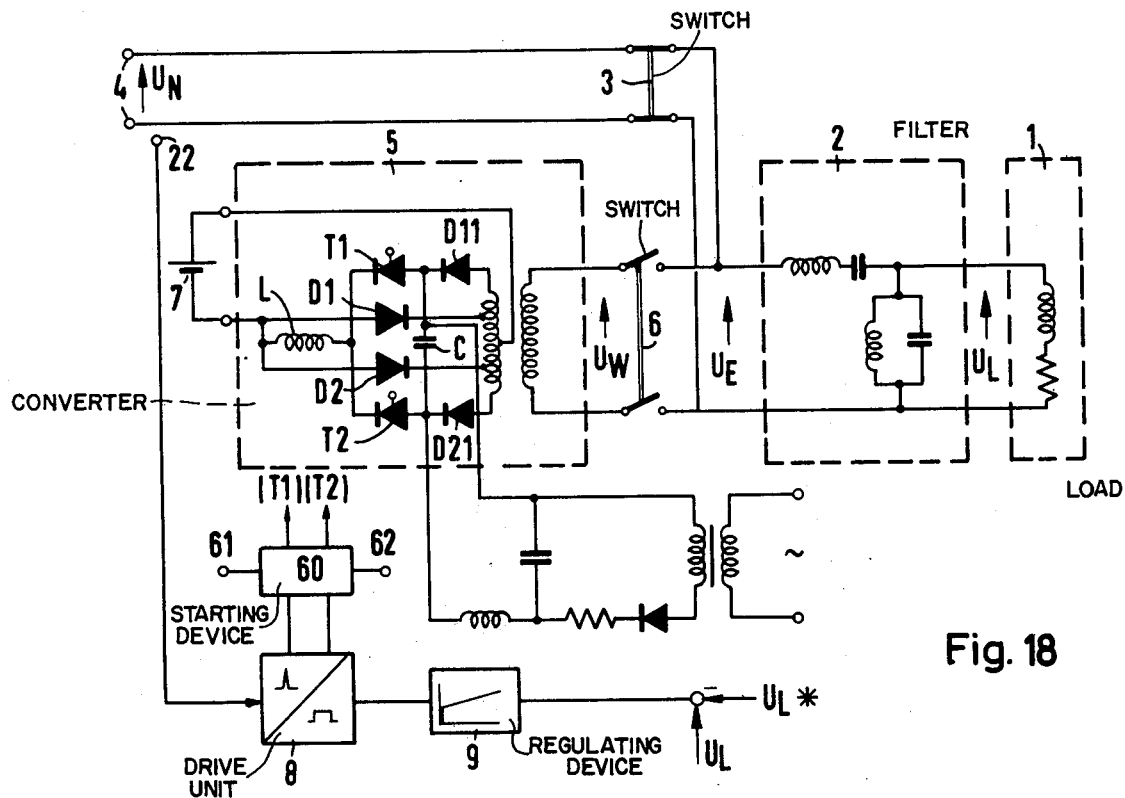
FIG. 18 shows a circuit arrangement including a converter which can be started by means of a fourth embodiment of the starting-up method of the present invention.
Figure 19:
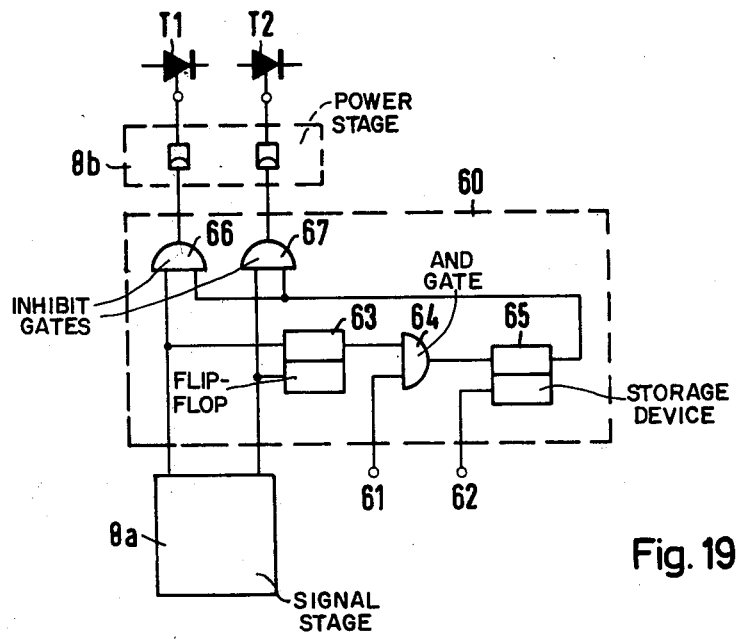
FIG. 19 illustrates a starting device for use in the converter of FIG. 18.

FIG. 18 shows circuit arrangement analagous to the circuit of FIG. 14, with the exception that the starting device 50 is replaced by a starting device 60, the details of which are illustrated in FIG. 19. As shown, the starting device 60 is also arranged between the signal stage 8a and the power output stages 8b of the drive unit 8, so that the signal processing can be performed at a low power level. The starting device 60 includes a flipflop 63 which is fed at its setting input by the firing pulses for the valve T1 and at its resetting input by the firing pulses for the valve T2. The polarity of the output signal of the flipflop 63, therefore, alternates in the same manner as the polarity of the output voltage of the inverter 5 would alternate if the firing pulses to the controlled valves T1 and T2 were released thereto. In the present case, the output signal of the flipflop 63 is always a "1" signal when the valve T1 is receiving a firing pulse. An AND gate 64 follows the flipflop 63 and is connected through only if the output signal of the flipflop 63 is a "1" signal and in addition a "1" signal is also present as the starting command at the input terminal 61. The output of AND gate 64 is connected to the setting input of a storage device 65 whose output signal constitutes a release signal for the two inhibit gates 66 and 67 which are connected between the signal stage 8a of the drive unit and the power output stages 8b.

As before, for the purposes of explanation it is assumed that the energy storage devices in the commutation circuit of the converter 5 of FIG. 18 are pre-charged with a polarity such that the converter can be started only with the firing of the valve T1. If at the time of a starting command, a firing pulse is present at the pulse output leading to the valve T1, the AND gate 64 is made to conduct and the storage device 65 is set instantly, so that its output signal causes the inhibit gates 66 and 67 to conduct. The corresponding firing pulse is, therefore, coupled through the gate 66 and power stage 8b to the valve T1 without delay.

If on the other hand, a firing pulse is present at the time of a starting command at the pulse output leading to the valve T2, then the AND gate 64 remains cut off. The storage device 65 is not set and the inhibit gates 66 and 67 block the firing pulses. This inhibition stays effective until a firing pulse appears at the pulse output leading to the valve T2.

The storage device 65 can also be reset by a reset command at its resetting input 62. This can be done, for example, after operation of the converter 5 has started.

Figure 20:
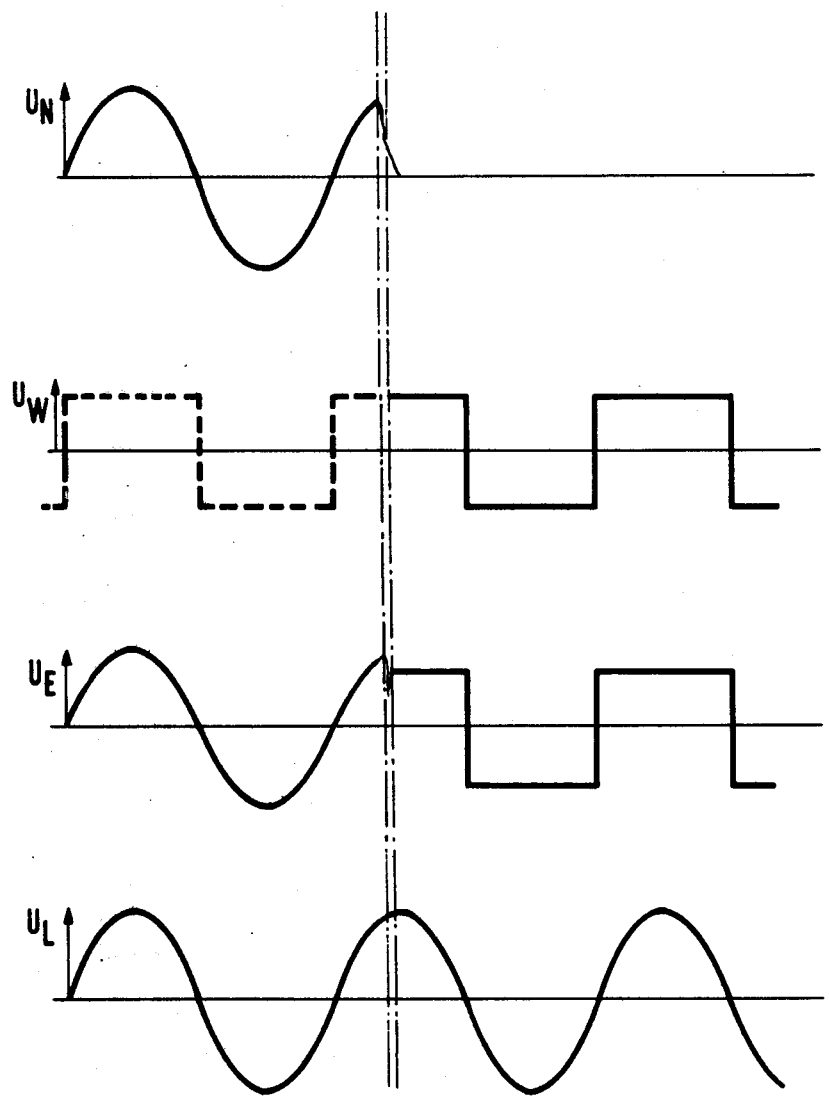
FIG. 20 shows typical voltage waveforms for the starting-up process of the converter of FIG. 18.

FIG. 20 illustrates the waveforms of the line voltage $U_N$, the inverter output voltage $U_W$, the filter input voltage $U_E$ and the load voltage $U_L$ for the circuit arrangement of FIG. 18. As shown, the break in the line voltage $U_N$ occurs during a positive half-wave. The valve T1, which results in a positive polarity of the output voltage of the converter, is therefore fired immediately, thereby starting the converter 5 without delay. The resultant load voltage $U_L$ exhibits no appreciable voltage break, as the filter preceding it smoothes out the voltage peaks in the filter voltage $U_E$.

If there is a break in the line voltage during a negative half-wave, the start of the converter is delayed up to the beginning of the next positive half-wave.

In order to prevent the starting-up process of the inverters in the circuit arrangements of FIGS. 14 and 18 from being initiated immediately before or during the commutation process, an inhibition stage may be provided which blocks the release of the start at such times. Such an inhibition stage may be designed in the manner shown in FIG. 12a. The inhibit stage would then be fed by the firing pulses for the valves T1 and T2, respectively.

Figure 21:
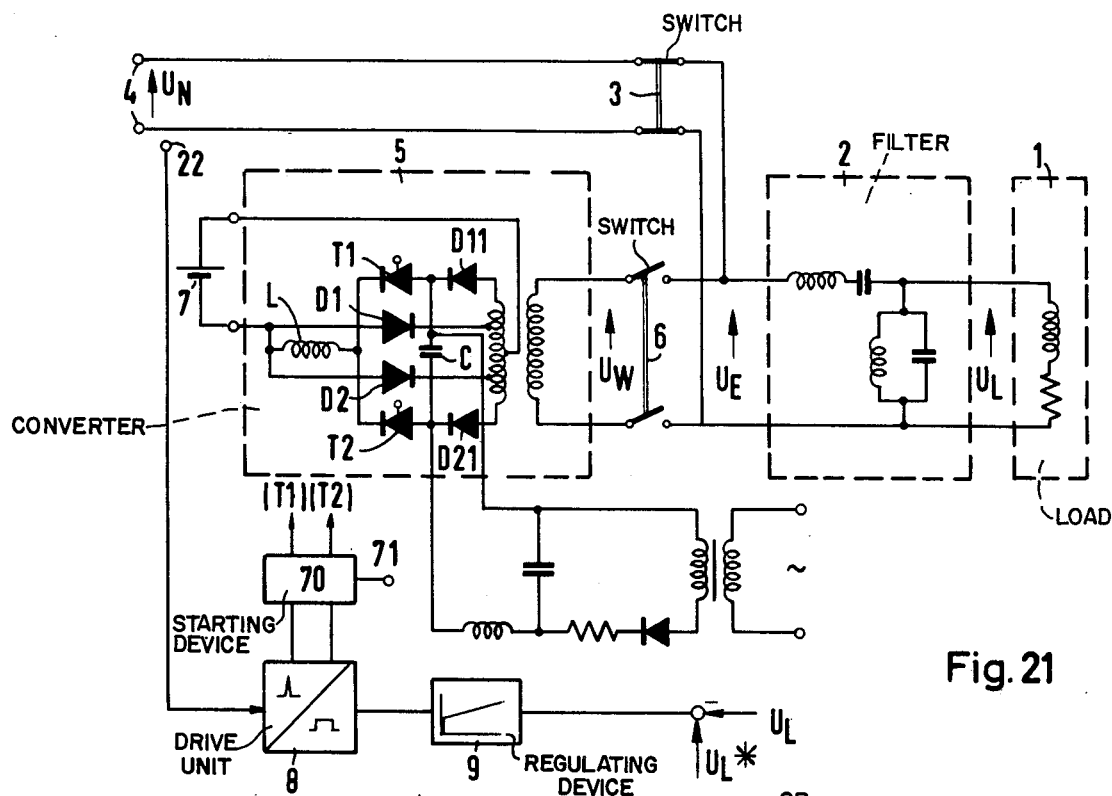
FIG. 21 illustrates a circuit arrangement having a converter which can be started by means of a fifth embodiment of the starting-up method according to the present invention.

FIG. 21 illustrates another circuit arrangement similar in design to that of FIG. 14, with the exception that the starting device 50 has been replaced by a starting device 70. The device 70 blocks the firing pulses from drive unit 8 in the stand-by position and releases them upon a starting command. The commutating capacitor C of the converter 5 is again precharged with a predetermined polarity by a charging device. Upon a starting command, that valve of the converter 5 which carries the polarity of the converter output voltage predetermined by the polarity of the pre-charge on the capacitor C is fired immediately. If this polarity of the output voltage of the converter turns out to be incorrect, commutations in rapid succession are performed until the output voltage $U_W$ of the converter 5 has the required polarity.

Figure 22:
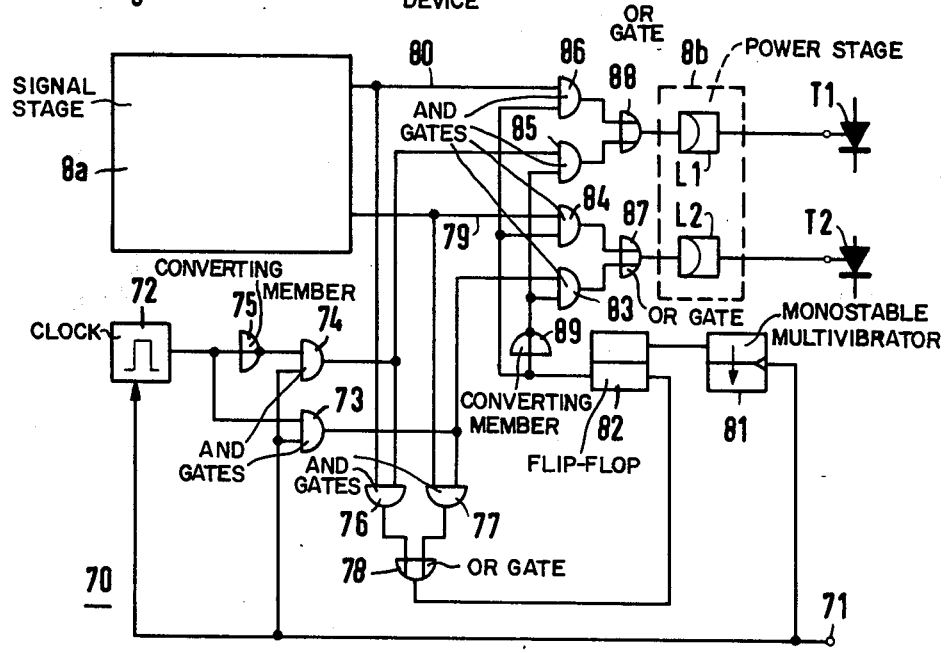
FIG. 22 shows the details of the starting device of the converter of FIG. 21.

FIG. 22 shows an illustrative circuit arrangement for the starting device 70. For the purposes of explanation, it has been assumed in the circuit of FIG. 2 that the pre-charge of the commutating capacitor C is such that the start of the converter 5 must be effected only by firing the valve T2. In case of a "1" signal as the starting command at the input terminal 71, a monostable multivibrator 81 generates a pulse which sets a flipflop 82. The output of flipflop 82 serves to infuence a gating circuit comprising the AND gates 83 to 86 and the OR gates 87 and 88, the latter AND and OR gates being arranged between the signal stage 8a and the power output stages 8b of the drive unit 8. If the flipflop 82 is set by the starting command, the "0" signal at its lower output cuts off the ANDS gates 84 and 86, whose upper inputs are connected with the pulse outputs 79 and 80 of the signal stage 8a of the drive unit. As a result, the firing pulses at both pulse outputs are blocked. The output signal of the flipflop 82 is also fed to an converting member 89 where it is converted into a "1" signal which is coupled to one of the inputs of each of the AND gates 83 and 85.

The starting device 70 further includes a clock 72 whose frequency is substantially higher than the frequency of the output voltage $U_W$ of the converter 5. A suitable clock frequency may for example, be 1 kHz, if the output voltage of the converter has a frequency of 50 or 60 Hz. The clock 72 operates start-stop and starts with a "1" signal upon application of a starting command at its release input. This "1" signal is conjunctively linked with the starting command and an AND gate 73 whose output is fed to the second input of the AND gate 83. At the inputs of the AND gate 83 are, therefore, a "1" signal from the AND gate 73 and a further "1" signal from the inverting member 89. The AND gate 83 is thus caused to conduct and its output signal is fed to the power output stage L2, thereby causing the firing of the valve T2. The first "1" signal appearing in the output clock signal is also converted by a converting member 75 and blocked by and AND gate 74.

It should be pointed out that the above-mentioned operation, particularly the firing of the valve T2, proceed completely independently of the firing pulses of the signal stage 8a of the drive unit.

After the valve T2 is fired, there is then a determination as to whether the correct valve was fired. For this purpose, a coincidence stage including the two AND gates 76 and 77 and an OR gate 78 is provided, the output of the latter gate being connected to the resetting input of the flipflop 82. If the valve T2 was the correct valve to be fired, the pulse output 79 carries a "1" signal as a firing signal. The signal is linked conjunctively in and the AND gate 77 with the "1" signal of the AND gate 73 and results in an output signal which is fed to the resetting input of the flipflop 82 via the OR gate 78. The signal causes the output signal to the flipflop 82 to change from a "0" signal to a "1" signal, thereby releasing the AND gates 84 and 86 and cutting off, via the converting member 89, the AND gates 83 and 85. The starting device thus no longer blocks and the pulses of the signal stage 8a which now are applied to the valves T1 and T2 as firing pulses via the power output stages L1 and L2.

If the valve T2 was the incorrect valve to fire, the firing pulse output 80 carries a "1" signal and the firing pulse output 79 a "0" signal. In such case, the AND gate 77 remains cut off, and the flipflop 82 continues to produce a "0" signal at its output. When the clock signal of the clock 72 changes from "1" to a "0" signal, the AND gate 74 becomes conducting and causes a "1" signal to appear at the output of the AND gate 85. In addition, the AND gate 76 is also caused to conduct and resets the flipflop 82. The starting device is thus blocked and the pulse at the output 80 is coupled, via the AND gate 86, to the output stage L1, which amplifies this pulse and feeds it to the valve T1.

Figure 23:
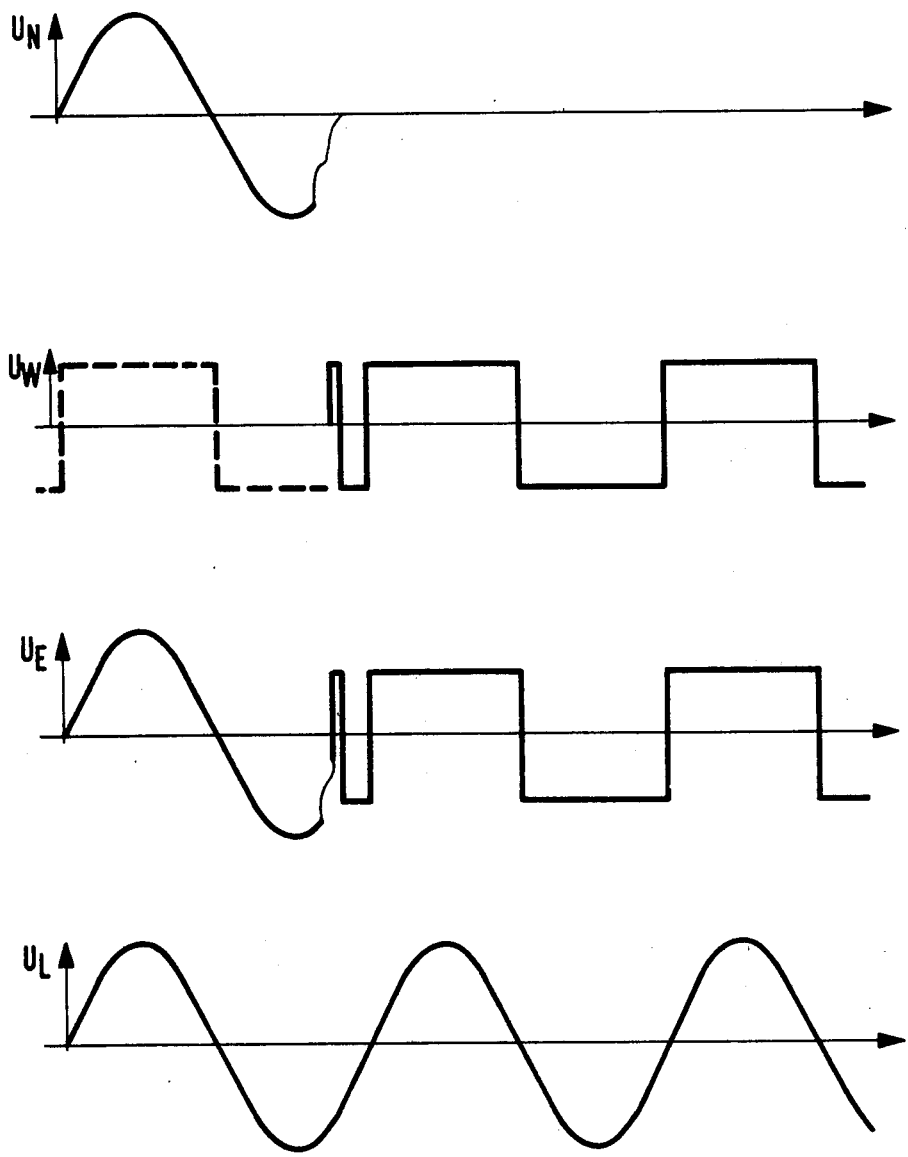
FIG. 23 illustrates typical voltage waveforms for the starting-up process of the converter of FIG. 21.

FIG. 23 shows the waveforms of the line voltage $U_N$, the converter output voltage $U_W$, the filter input voltage $U_E$ and the load voltage $U_L$ for the circuit arrangement of FIG. 21. For the time prior to the breakdown of the line voltage $U_N$, the output voltage $U_N$ of the converter 5 is shown in broken lines. This output voltage would result if the firing pulses of the drive unit were released to the controlled valves of the converter during such time.

Upon a break in the line voltage $U_N$ during its negative half-wave, that valve of the converter which may be fired due to the polarity of the pre-charge of the commutating capacitor is fired immediately. Let it be assumed, for example, that this is the valve T2, which carries the positive polarity of the output voltage of the converter. Since a negative output voltage is required, a commutation to the valve T1 is performed in the abovedescribed manner. The positive, and therefore, incorrect polarity of the output voltage $U_W$ of the converter is present only for the duration of one pulse in the clock signal of the clock 72.

As indicated, the voltage $U_E$ at the input of the filter is at first identical with the line voltage $U_N$. After the break in the line voltage there is a very short positive voltage pulse, and, immediately following, a negative voltage pulse. This is followed by the square-wave output voltage of the converter. The filter 2 filters the output voltage of the converter, so that the load is always supplied with sinusoidal voltage. However, the action of the filter causes the voltage peaks at the voltage break to be smoothed out.

In the circuit arrangements described hereinabove, converters of relatively simple design have been employed. However, the invention is not intended to be limited thereto. By appropriate multiplication, the starting-up method according to the invention can be used with any converter and, in particular, with multi-phase converters.

Figure 24:
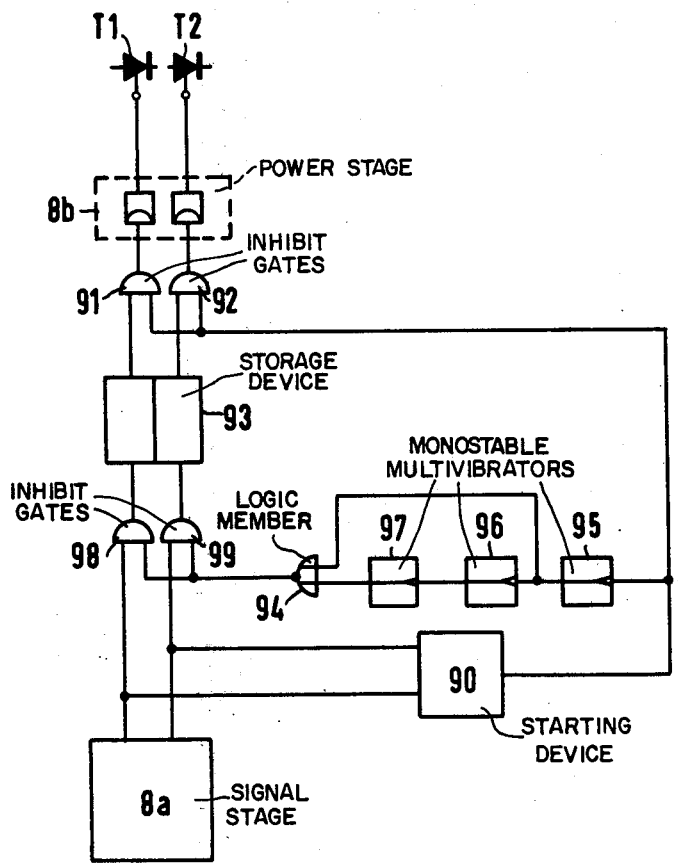
FIG. 24 shows a delay circuit which can be used for preventing unpermissibly fast commutation in the starting-up process according to the present invention.

FIG. 24 depicts another inhibit stage which is ideally suited for use with the converters in the above-described arrangements, i.e., with converters which are controlled by a pulse method. The inhibit stage of FIG. 24 is employed to prevent the converter with which it is used from being started during a commutation process or shortly before a commutation process. As shown, the stage contains a storage device 93 which is connected between the signal stage 8a and the power output stages 8b of the drive unit 8. The inputs of the storage device 93, in turn, are fed to two other inhibit gates 91 and 92. The inhibit gates 91 and 92 can be made to conduct by the release signal of a starting device 90. The starting device 90 may be, for example, of similar design to these already described above, i.e., startind devices 12, 50, 60 or 70. The inhibit gates 98 and 99 on their input sides are controlled by the output signal of a time delay circuit which includes three series connected monostable multivibrators 95, 96 and 97 which are followed by a logic member 94. The pulse width of the first monostable multivibrator 95 corresponds to a duration which is longer than the duration of one commutation, e.g., 1.5 times the duration of one commutation. The pulse width of the second monostable multivibrator 96 corresponds to a duration which is substantially shorter than one commutation, e.g., one tenth of the duration of one commutation. The pulse width of the third monostable multivibrator 97 corresponds to a duration which is also longer than the duration of one commutation, e.g., again 1.5 times the duration of one commutation. The output signals of the first monostable multivibrator 95 and the third monostable multivibrator 97 are linked in the logic member 94.

When the starting device 90 generates a release command the firing pulses from 8a are released instantly to the output stages 8b, via the inhibit gates 91 and 92, which are switched into conduction. The transfer of new firing pulses into the storage device 93, however, is now blocked by the output signal of the monostable multivibrator 95. After the end of the pulse of the latter monostable multivibrator the transfer of the new firing pulses is released for the pulse duration of the monostable multivibrator 96 and is thereafter again blocked for the pulse duration of the monostable multivibrator 97. At the end of the pulse of the monostable multivibrator 97, the transfer of new firing pulses is released indefinitely.

The inhibit stage of FIG. 24 can be simplified or expanded in view of the pulse control method of the particular converter with which it is being employed. If used with the converter circuit shown in FIG. 14, the inhibit stage could be simplified, for example, in such a manner that the two multivibrators 96 and 97 and the OR gate 94 are omitted. In such case, the transfer of new firing pulses would then be blocked only for a predetermined period of time which is longer than the duration of the commutation and is, for example, 1.5 times as long. If used with converters in which the pulse control forms short voltage pulses which follow each other rapidly, the inhibit stage 24 can be expanded by the addition of further monostable multivibrators. In this case, there will then occurr several blocking and release cycles for the transfer of new firing pulses.

As can be appreciated from the above, therefore, the inhibit stage in FIG. 24 permits a starting procedure for its associated converter comprising the following steps:

a. Upon a starting command, a charge of the firing pulses is first blocked for a first, predetermined period of time which is longer than the duration of one commutation;

b. subsequently, a change of the firing pulses is relesed for a second, predetermined period of time which is substantially shorter than the duration of a commutation and longer than the delay time of the pulse output stages;

c. thereupon, a change of the firing pulses is again blocked for a third, predetermined period of time which is longer than the duration of one commutation;

d. finally, after a predetermined number of such blocking and release cycles, the firing pulses are relesed indefinitely.

In converters of the type used in the arrangements described hereabove, the particular pulse control method employed may require use of a pulse of minimal width. If such is the case successive commutations occur after the shortest possible time. Thus, if one-time blocking of the change of the firing pulses is also employed, there is then a possiblity of having the commutation process follow immediately after the release of the firing pulses, which can lead to a short circuit in the converter. Such a result is effectively prevented by repeated, successive blocking and release cycles for the change of the firing pulses.

Figure 25A:
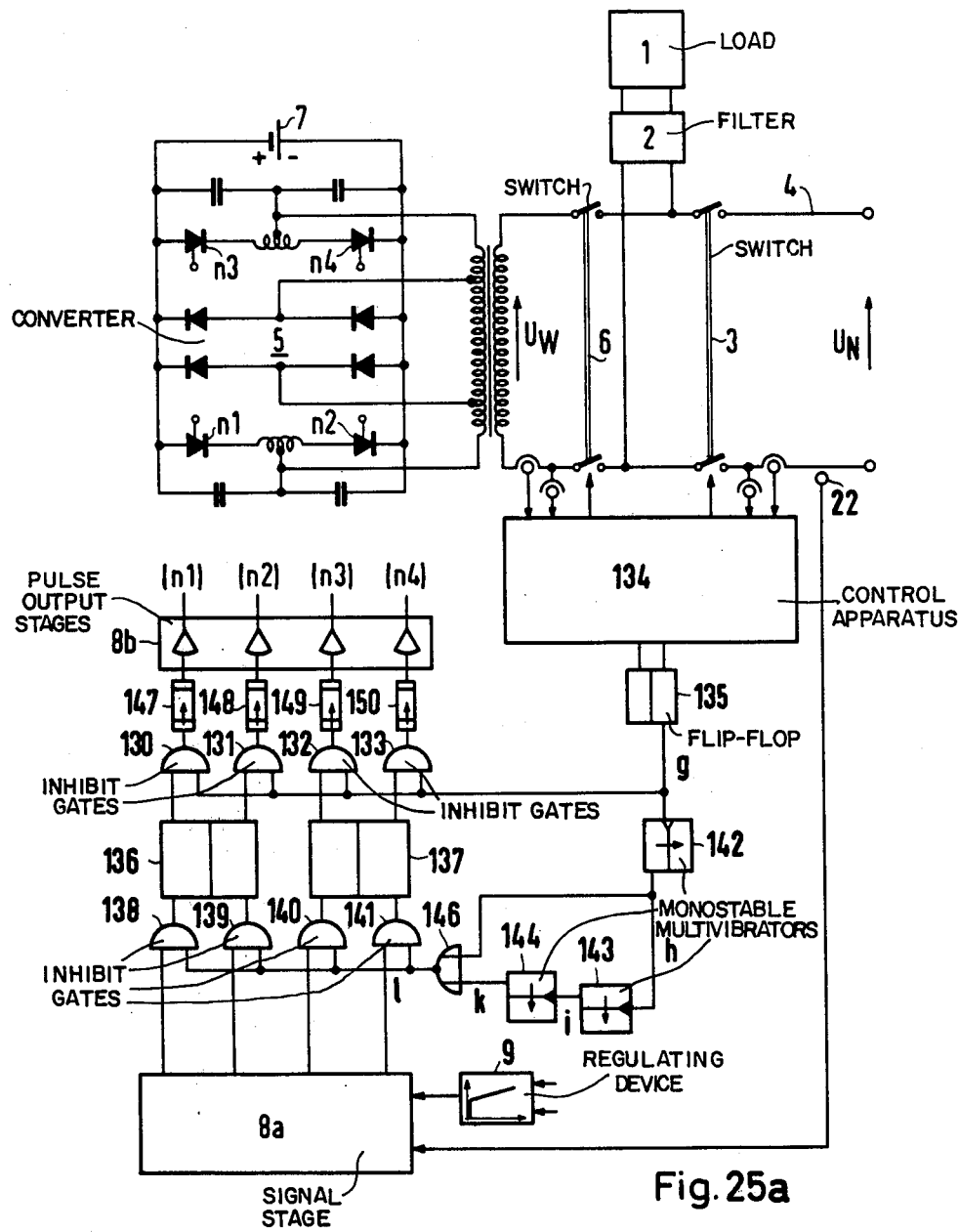
FIG. 25a shows a circuit arrangement employing a converter which is influenced by a circuit arrangement which prevents unpermissibly fast commutation during starting-up of the converter in accordance with the method of the invention.

FIG. 25a shows a circuit arrangement of another embodiment of the invention which employs an inhibit stage which prevents converter commutations from following each other at an unpermissibly rapid rate.

In FIG. 25a, a load 1 is connected, via a filter 2 and a line switch 3, to a power system 4 which delivers a line voltage $U_N$. A converter 5, which is supplied from a substitute current source shown as a battery 7, can be connected, via a further 6, to the load 1, if the power system 4 fails or if it can no longer cover the load demand. Associated with the converter 5 is a control unit which comprises a drive unit having a signal stage 8a and pulse output stages 8b. Connected to the signal stage 8a is a series-connected regulating device 9. The aforesaid drive unit is synchronized with the power system 4 via a synchronizing tap 22. The regulating device 9, which may be designed as a voltage or load regulator, is fed on its input side by an appropriate actual-value load voltage and an appropriate reference voltage. Steps are peferably taken to ensure that the firing pulses of the drive unit have the correct firing angle in the stand-by position. For purposes of explanation, the signals of the drive unit are assumed to be binary signals which are present for the respective conduction periods of their associated valves.

In the stand-by position, the regulating device 9 and the signal stage 8a of the drive unit are operative. The transmission of the firing signals of the signal stge 8a to the pulse output stages 8b, however, is blocked via the inhibit gates 130 to 133.

The circuit arrangement of FIG. 25a also includes a control apparatus 134 which is acted upon on its input side by measured values for the line voltge and the line current, by the output voltage and the output current of the converter and, if applicable, by other measure quantities. The control apparatus 134 controls the switches 3 and 6 and starts the converter 5. In normal operation, the line switch 3 may, for example, be closed and the switch 6 open. The load is then supplied frm the power system 4. In the event of a break in the line voltage $U_N$ of the power system 4, the control device 134 opens the line switch 3, starts the converter 5 and closes the switch 6. The load is now suplied via the converter 5 from the battery 7. When the line voltage recovers, the converter is stopped and the operation is switched back to the power line. In the following discussion what is of particular importance with respect to the control apparatus 134 is that it delivers at its lower outputs start and stop commands for the converter 5. Upon a starting command, a flipflop 135 is set as a command storage device and is reset upon a stop command.

A circuit arrangement which includes two storage devices 136 and 137 having inhibit gates 138 to 141 on their input sides and inhibit gates 130 to 133 on their output sides, is connected between the signal stage 8a of the drive unit and the pulse output stages 8b. The inhibit gates 130 to 133 are controlled on their input sides by the output signal g of the flipflop 135. The inhibit gates 138 to 141 on the other hand, are controlled on their input sides by the output signal $l$ of a delay circuit which includes three monostable multivibrators 142, 143, 144 and a logic member 146, which is shown as a NOR gate. In the stand-by position, the output signal $l$ of the time delay circuit switches the inhibit gates 138 to 141 into conduction. The firing signals of the signal stage 8a for the valves n1, n2 and for the valves n3, n4, respectively, are thus coupled to the inputs of the storage devices 136 and 137, respectively. The output signals of the storage device 136 correspond to the firing signals for the valves n1 and n2 and simulate the current-conducting and -blocking state of such valves. The output signals of the storage device 137, on the other hand, correspond to the firing signals for the valves n3 and n4 and simulate the current-conducting and -blocking state of these valves. The transmission of the output signals of the storage devices 136 and 137 to the pulse output stages 8b is blocked in the stand-by position by the inhibit gates 130 to 133. Time delay members 147 to 150 are arranged between the inhibit gates 130 to 133 and the pulse output stages.

The operation of the circuit arrangement of FIG. 25a will be explained by refering to the signal waveforms, in FIG. 25b. Upon a starting command from the control apparatus 134, the flipflop 135 is set. Its output signal $g$ is thus a "1" signal and switches the inhibit gates 130 to 133 into conduction. The firing pulses at the outputs of the storage devices 136 and 137 are thereby immediately connected-through to the controlled valves of the converter 5 via the pulse output stages. The output signal $g$ of the flipflop 135 also feeds the first monostable multivibrator 142, whose pulse width $a142$ is longer than the duration of a a commutation, e.g., 1.5 times it value. The output signal $h$ of the monostable multivibrator 142 is then coupled via the logic member 146 as an inhibit signal to the inputs of the inhibit gates 138 to 141. The transfer of new firing signals from the signal stage 8a of the drive unit into the storage devices 136 and 137 is, therefore, blocked for the duration of $a142$ of the pulse of the monostable multivibratorvibrator 142.

The output signal $h$ of the monostable multivibrator 142 triggers with its decaying flank the second monostable multivibrator 143, whose pulse width $a143$ is substantially shorter than the duration of a commutation and longer than the delay time of the pulse output stages, e.g., one-hundredth of the duration of the commutation. The output signal $i$ of the second monostable multivibrator 143 triggers with its decaying flank the third monostable multivibrator 144, whose pulse width $a144$ is again longer than the duration of a commutation and is, for instance, 1.5 times the duration of the commutation. The output signal $l$ of the logic member 146, therefore, has the waveform shown in FIG. 25b. The transfer of new firing signals into the storage device 136 and 137 is thus blocked during the period $a142$, released during the following very short period $a143$, then blocked again for the period $a144$ and is finally released indefinitely.

Figure 25B:
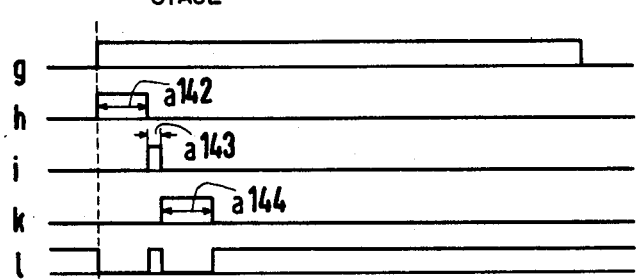
Figure 25C:
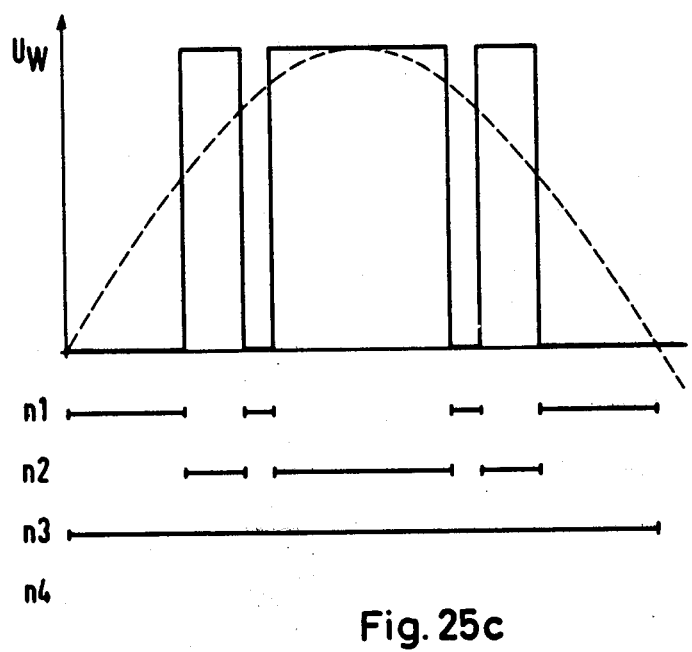
Figure 25D:
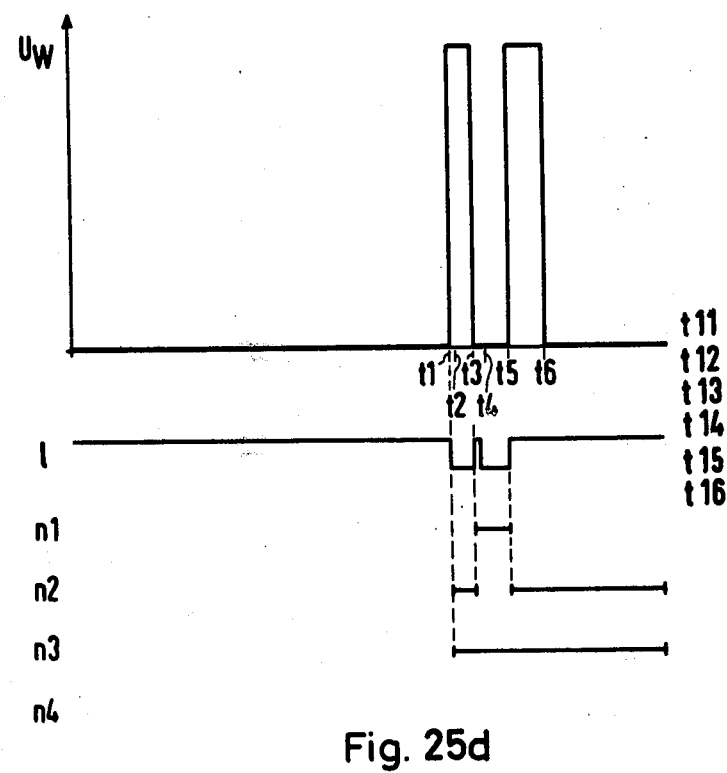

FIGS. 25c and 25d serve to explain the meaning of the blocking and release cycle of FIG. 25b.

In FIG. 25c, a positive half-wave of the output voltage $U_W$ of the converter 5 is shown above the corresponding firing pulses at the output of the signal stage 8a. The output voltage $U_W$ comprises a wide pulse in the middle and two narrow pulses flanking it. The sine half-wave approximated by these pulses is drawn as a dotted line.

For the purpose of explaining the starting process shown in FIG. 25d, it is assumed that the drive unit delivers in the stand-by position firing pulses which would generate the converter output voltage shown in FIG. 25c, if the firing pulses were released to the controlled converter valves.

In FIG. 25d, a starting command is given at the time t11. The firing signals already present at the outputs of the storage devices 136 and 137 are released instantly to the appropriate pulse output stages, so that the valves n2 and n3 are fired and a positive output voltage $U_W$ of the converter appears.

At the time t12, the first commutation would have already taken place in the case being illustrated. The time t11 to t12 is too short, however, to prepare the commutation devices for commutation. The start of the commutation which would occur at the time t12 is thus prevented by blocking a change from occurring in the firing signals via the output signal $l$ of the delay circuit. Only at the end of the pulse duration a142, of the monostable multivibrator 142 at the time t13, is the transfer of new firing signals into the storage devices 136 and 137 released. The first commutation, therefore, takes place at the time t13 through the firing of the valve n1.

At the time t14, the firing of the valve n2 and thereby, the next commutation, would normally occur. It is assumed that the time from t13 to t14 is again too short to complete the commutation process. The start of the commutation normally occurring at the time t14 is, therefore, also prevented by the output signal $l$ of the delay circuit, as the output signal 1 blocks a change of the firing signals up to the time t15. The commutation thus takes place only at the end of the pulse duration a144 of the monostable multivibrator 144, at the time t15, through the firing of the valve n2.

From the time t15 on, the transfer of the firing signals into the storage devices 136 and 137 is released indefinitely. The next commutation, therefore, occurs at the time t16.

The delay members 147 to 150 between the inhibit gates 130 to 133 and the pulse output stages 8b can be omitted if the pulse width a143 of the monostable multivibrator 143 is shorter than the natural signal delay time occurring via the path through the inhibit gates 139 to 141, the storage devices 136, 137 the inhibit gates 130 to 133 and the pulse output stages 8b. This, in general, will be the case as the pulse output stages in particular have a response delay. If the above conditon is not fulfilled, delay members 147 to 150 are each used to provide a delay which is somewhat longer than the duration a 143 of the pulse of the monostable multivibrator 413.

Figure 25E:
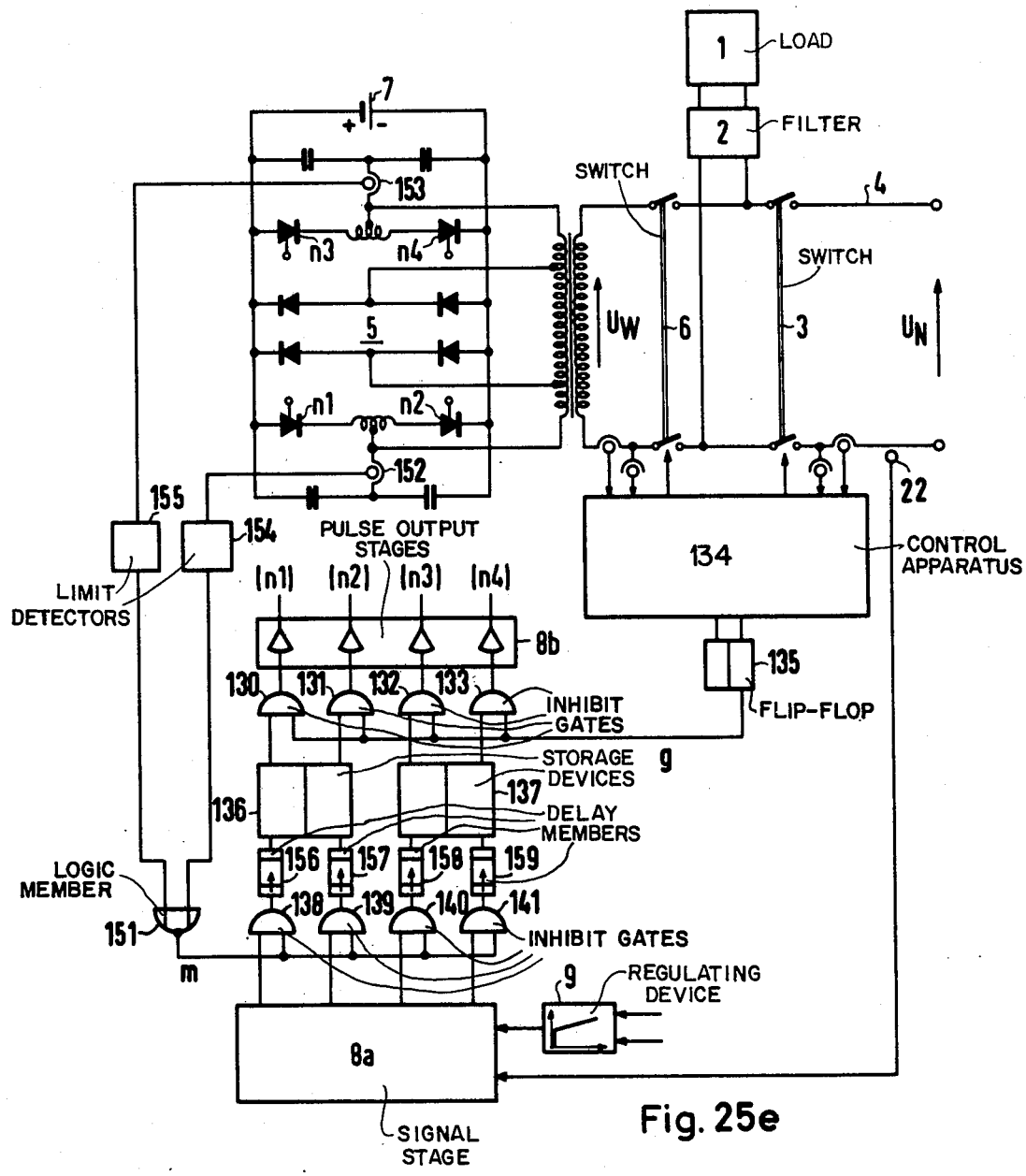

FIG. 25e shows a modification of the circuit arrangement of FIG. 25a. As illustrated, in this case the inhibit gates 138 to 141 are controlled by the output signal $m$ of a logic member 151 whose inputs are connected to measuring sensors 152 and 153 for detecting the commutation process. The measuring sensor are designed as current measuring transormers and are arranged in respective commutation circuits of the two bridge arms of the converter 5. The measuring sensors 152 and 153 are followed by limit detectors 154 and 155 which are designed to change state when the current applied thereto exceeds a predetermined limit the latter limit being below current flowing in the commutation circuit during the commutation process. As soon as the current in one of the two commutation circuits exceed this predetermined limit one of the limit detectos 154 or 155 following the measuring sensors 152 or 153 changes its output signal and thereby blocks the inhibit gates 138 to 141 on their input sides via the logic member 151 which is designed as a NOR gate. The transfer of new firing signals from the signal stage 8a into the storage devices 136 and 137 is, therefore, possible only if no commutation process is occurring.

Between the inhibit gates 138 to 141 and the inputs of the storage devices 136 and 137, delay members 156 to 159 are connected whose response delay corresponds to the unavoidable null error of the measuring sensors 152 and 153.

It should be noted that instead of measuring the currents in the commutation circuits to indicate operation of the commutation process, the voltage in such circuits could be measured. It is also possible to couple the measured values for the currents or voltages in the commutation circuits via differentiating members in order to detect the changes in the state of the commutation circuits.

It should be also noted that with the circuit arrangement shown in FIG. 25e, the following starting-up procedure for the converter 5 can be carried out:

a. In the stand-by position, the transmission of firing pulses from the drive unit, which is continuously running in the stand-by position and is synchronized with a line voltage, to the controlled valves of the converter is blocked, b. upon a starting command, the firing pulses are released instantaneously; a change of the firing pulses, however, is blocked while commutation processes are running.

In the aforesaid start up procedure, moreover, running commutation processes are detected by measuring sensors in the commutation circuits.

What is claimed is:

1. A converter circuit arrangement comprising:
 a power stage including:
  controlled main valves;
  and commutation devices associated with said valves;
 and a continuously running control apparatus for controlling said power stage including:
  a drive unit for generating firing pulses and adapted to be synchronized to a line voltage and to be fed by a regulating device;
  energy storage means, including a charging device and at least one energy storage device;
  connecting means for connecting said energy storage means to said commutation devices;
  and a starting device adapted to receive a starting command and including a release unit for controlling the relasing of said firing pulses to said valves.

2. An arrangement in accordance with claim 1 in which:
 said energy storage means, includes two energy storage devices which store energy of opposite polarity;
 said connecting means includes a controllabe switching device;
 and said starting device additionally includes a switch control for controlling said switching device, said starting device upon being presented with a starting command causing said switch control to control said switching device so as to connect that storage device to said commutation devices whose energy is that energy required for commutating the valve of said power stage associated with the firing pulse presently being generated by said drive unit, and causing said release unit to release said firing pulses after the transfer of the energy to said commutation devices.

3. An arrangement in accordance with claim 2 in which:
said commutation devices include a commutation capacitive means;
one of said energy storage devices includes a capacitor charged to a positive potential and the other includes a capacitor charged to a negative potential;
and said controllable switching device includes first and second switching elements for connecting said negatively and positively charged capacitors to said capacitive means.

4. An arrangement in accordance with claim 1 in which:
said charging means charges said energy storage device to a predetermined polarity;
and said release unit upon receipt of a starting command by said starting device delays the release of said firing pulses to the start of the next half-wave of the output voltage of the converter circuit whose polarity corresponds to said predetermined polarity.

5. An arrangement in accordance with claim 4 in which said starting device further includes:
a flipflop which is fed at its setting input by the firing pulses associated with one polarity of the output voltage of the converter circuit and at its resetting input by the firing pulses associated with the other polarity of said converter output voltage;
a storage device for developing an output signal for controlling said release unit;
and a logic member whose one input is coupled to the output of said flip flop and whose other input is adapted to be responsive to said starting command, said logic member having an output connected to said storage device and setting said storage device upon receipt of said starting command and the appearance of a dynamic flank output of said flip flop.

6. An arrangement in accordance with claim 1 in which:
said charging means charges said energy storage device to a predetermined polarity;
and said release unit upon receipt of a starting command by said starting device releases said firing pulse immediately if the polarity of the output voltage of the converter circuit corresponding to said predetermined polarity agrees with the polarity of the required converter output voltage, or, if said polarities do not agree, delays the release of said firing pulses until said polarities do agree.

7. An arrangement in accordance with claim 6 in which:
said release unit includes inhibit gates;
and said starting unit further includes:
a flip flop which is fed at its setting input by the firing pulses associated with one polarity of the output voltage of the converter circuit and at its resetting input by the firing pulses associated with the other polarity of said converter output voltage;
and a logic member adapted to receive the starting command and the output of said flip flop and to conjunctively combine said command and said flip flop output, said logic member having an output connected to said gates.

8. An arrangement in accordance with claim 1 in which:
said charging means charges said energy storage device to a predetermined polarity;
and said release unit upon receipt of a starting command by said starting device causes the valve which carries the polarity of the output voltage of the converter associated with said predetermined polarity to be fired immediately and, if this polarity does not agree with the required polarity, causes rapidly following commutations to be performed until the polarity of the output voltage agrees with the required polarity.

9. An arrangement in accordance with claim 8 in which said starting device comprises:
a clock adapted to be responsive to said starting command and having a frequency substantially higher than the frequency of the output converter voltage;
a coincidence stage for comparing said firing pulses to the output of said clock;
a flip flop which is responsive to said starting command to the output of said coincidence stage; and
a gating circuit responsive to said firing pulses and to the output of said flip flop.

10. An arrangement in accordance with claim 1 which further includes:
means for preventing said release unit releasing said first firing pulses from releasing a change in said pulses for a predetermined period of time which is longer than the duration of one commutation.

11. An arrangement in accordance with claim 10 in which:
said preventing means after said first predetermined period permits changes in said firing pulses to be released for a second predetermined period of time, which is shorter than the duration of one commutation and after said second period prevents the release of changes in said firing pulses for a third predetermined period of time which is greater than the duration of one commutation.

12. An arrangement in accordance with claim 11 in which said means for preventing includes:
a first set of inhibit gates responsive to said firing pulses;
a storage unit connected to the outputs of said gates;
a second set of inhibit gates connected to the outputs of said storage unit, and to the output of said starting device;
and a delay circuit for feeding said first set of gates, said delay circuit including first, second, and third multivibrators connected in series and having first, second and third pulses widths, and a logic member whose inputs are connected with the outputs of said first and third multivibrators, said first multivibrator being connected to the output of said starting device and said first, second and third pulse widths being equal to said first, second and third predetermined periods of time, respectively.

13. An arrangement in accordance with claim 1 in which:
said release unit prevents the release of said firing pulses during stand-by position and releases them immediately upon receipt by the starting device of a starting command;

and which further includes means for preventing said release unit from releasing a change of the firing pulses during the running of commutation processes.

14. A method for starting up with correct phase a converter having forced commutation, said converter including a power stage having controlled main valves and commutation devices associated therewith and said converter further including a control apparatus for controlling a drive unit for generating firing pulses and being adapted to be responsive to a regulating device, said method comprising the steps of:

in stand-by position; charging at least one energy storage device with an amount of energy required for commutation;

in stand-by position; blocking said firing pulses via said control apparatus which is continuously running;

and, upon a starting command, making available the stored amount of energy for commutating and releasing said firing pulses.

15. A method according to claim 14 in which:

in stand-by position; two energy storage devices are charged with amounts of energy of opposite polarities;

and, upon a starting command, making available for commutation that amount of energy whose polarity is required for commutating the valve associated with the firing pulse being generated.

16. A method according to claim 14 in which:

said energy storage device is charged with a predetermined polarity and is included in said commutation devices;

and upon a starting command, delaying the releasing of the firing pulses to the start of the next half-wave of the converter output voltage whose polarity is determined by said predetermined polarity.

17. A method according to claim 14 in which:

said energy storage device is charged with a predetermined polarity and is included in said commutation devices;

and, upon a starting command, releasing the firing pulses immediately if the polarity of the output voltage of the converter associated with said predetermined polarity agrees with a required polarity or delaying the release of the firing pulses, until said polarities agree.

18. A method according to claim 14 in which:

said energy storage device is charged with a predetermined polarity;

and said method further includes the steps of:

upon a starting command, prior to the release of said pulses fixing immediately the valve of the converter which carries the polarity of the output voltage of the converter associated with said predetermined polarity;

and, if said polarity of the voltage of said fired valve does not agree with a required polarity, performing rapidly following commutations until the converter output voltage has said required polarity.

19. A method according to claim 14 including the step of:

after releasing said firing pulses, blocking for a predetermined period of time the releasing of a change of said firing pulses, said predetermined period of time being longer than the duration of a commutation.

20. A method according to claim 19 including the steps of:

blocking for a first predetermined period of time the releasing of a change of said firing pulses, said first predetermined period of time being longer than the duration of a commutation;

after said blocking, permitting for a second predetermined period of time the releasing of a change of said firing pulses, said second predetermined period of time being shorter than the duration of a commutation;

after said permitting, again blocking for a third predetermined period of time the releasing of a change of said firing pulses, said third predetermined period of time being longer than duration of a commutation;

after said again blocking, permitting indefinitely the releasing of a change of said firing pulses.

21. A method according to claim 20 in which said sequences of steps of blocking, permitting and again blocking is repeated a predetermined member times prior said step of permitting an indefinite release.

22. A method according to claim 14 in which:

upon a starting command, releasing said firing pulses immediately, and thereafter blocking the release of a change of said firing pulses during the running of commutation processes.

* * * * *

UNITED STATES PATENT AND TRADEMARK OFFICE
CERTIFICATE OF CORRECTION

PATENT NO. : 4,058,738

DATED : November 15, 1977

INVENTOR(S) : Janos Udvardi-Lakos

It is certified that error appears in the above—identified patent and that said Letters Patent are hereby corrected as shown below:

Title page, item [30], Foreign Application Priority Data, should list the following foreign applications:

| Date | Country | Number |
|---|---|---|
| Sept. 27, 1974 | Germany | 2446335 |
| Sept. 27, 1974 | Germany | 2446390 |
| Sept. 27, 1974 | Germany | 2446389 |
| Oct. 22, 1974 | Germany | 2450127 |
| July 30, 1975 | Germany | 2534102 |
| Aug. 13, 1975 | Germany | 2536195 |

Signed and Sealed this

Third Day of October 1978

[SEAL]

Attest:

RUTH C. MASON
*Attesting Officer*

DONALD W. BANNER
*Commissioner of Patents and Trademarks*